US008655051B2

(12) United States Patent
Nasu et al.

(10) Patent No.: US 8,655,051 B2
(45) Date of Patent: Feb. 18, 2014

(54) IMAGE EDITING METHOD, IMAGE EDITING APPARATUS, COMPUTER PROGRAM, AND MEMORY PRODUCT

(75) Inventors: Masahito Nasu, Fukuoka (JP); Takayuki Tokumaru, Fukuoka (JP); Keiko Tanaka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 11/105,532

(22) Filed: Apr. 14, 2005

(65) Prior Publication Data

US 2005/0180624 A1  Aug. 18, 2005

Related U.S. Application Data

(63) Continuation of application No. PCT/JP03/01038, filed on Jan. 31, 2003.

(51) Int. Cl.
*G06K 9/00* (2006.01)

(52) U.S. Cl.
USPC .......................................... 382/154; 382/285

(58) Field of Classification Search
USPC .......... 382/154, 285; 345/419–424, 427, 653, 345/664, 679
See application file for complete search history.

(56) References Cited

U.S. PATENT DOCUMENTS

| 6,072,903 | A  | * | 6/2000  | Maki et al. ...................... 382/190 |
| 6,980,690 | B1 | * | 12/2005 | Taylor et al. ................... 382/154 |
| 7,068,835 | B1 | * | 6/2006  | Ban et al. ....................... 382/154 |
| 2002/0097906 | A1 | * | 7/2002  | Ishiyama ....................... 382/154 |
| 2002/0106114 | A1 | * | 8/2002  | Yan et al. ....................... 382/118 |
| 2002/0154812 | A1 | * | 10/2002 | Chen et al. ..................... 382/154 |
| 2003/0076991 | A1 | * | 4/2003  | Nishide .......................... 382/154 |
| 2003/0123713 | A1 | * | 7/2003  | Geng ............................. 382/118 |

FOREIGN PATENT DOCUMENTS

| JP | 5-225290    | 9/1993  |
| JP | 6-96177     | 4/1994  |
| JP | 6-215077    | 8/1994  |
| JP | 2001-188922 | 7/2001  |
| JP | 2002-373187 | 12/2002 |
| JP | 2003-6245   | 1/2003  |

* cited by examiner

*Primary Examiner* — Brian Le
(74) *Attorney, Agent, or Firm* — Staas & Halsey LLP

(57) ABSTRACT

In the case where a three-dimensional image including a plurality of element figures, such as a quadrangular plane, a curved surface including a ridgeline, and a cylinder, is edited using an image editing apparatus such as a three-dimensional CAD apparatus, when one element figure in the three-dimensional image is specified, other element figures connected to the specified one element figure, or other element figures included in the same three-dimensional image in which the one element figure is included are retrieved, and other element figure in the retrieved other element figures, which was determined as having a specific relationship to the one element figure is related to the one element figure. Then, the specified element figure and the element figures related to the specified element figure are edited collectively based on an operation received by the image editing apparatus.

4 Claims, 25 Drawing Sheets

(a)

(b)

(a)

(b)

(a)

(b)

F I G. 6

|  | MOVE | OFFSET PROCESS | CHANGE OF RADIUS | DELETE |
|---|---|---|---|---|
| RIDGELINE RELATING | ○ | ○ | ○ | ○ |
| TANGENT CONTINUOUS RELATING | × | ○ | — | × |
| CONCENTRIC RELATING | ○ | — | — | × |
| PROJECTING PART RELATING | × | × | — | × |
| HOLLOW PART RELATING | × | × | — | × |
| SHELL RELATING | ○ | — | — | × |

(a)

(b)

(a)

(b)

(a)

(b)

(a)

(b)

(a)

(b)

(a)

(b)

(a)

(b)

(a)

(b)

IMAGE EDITING METHOD, IMAGE EDITING APPARATUS, COMPUTER PROGRAM, AND MEMORY PRODUCT

This application is a continuing application, filed under 35 U.S.C. §111(a), of PCT International Application No. PCT/JP03/01038 which has an International filing date of Jan. 31, 2003 and designated the United States of America.

BACKGROUND OF THE INVENTION

The present invention relates to an image editing method for editing a three-dimensional image including a plurality of element figures, an image editing apparatus such as a three-dimensional CAD apparatus adopting the method, a computer program for realizing the apparatus, and a computer-readable memory product storing the program. In particular, the present invention relates to an image editing method, image editing apparatus, computer program and memory product, which improve the efficiency of the operation of editing images.

Image editing apparatuses such as a three-dimensional CAD (Computer-Aided Design) apparatus used for creating and editing (modifying) a three-dimensional image including a plurality of element figures (features) such as quadrangular planes, curved surfaces including ridgelines (fillets), and cylinders have been used in a variety of areas.

With an image editing method using an image editing apparatus, it is possible to specify an arbitrary element figure in a three-dimensional image and perform editing operations, such as move and rotation.

Next, examples of the editing operations will be shown.

FIG. 1 is an explanatory view showing an editing operation on a three-dimensional image.

FIG. 1(a) shows a pentagonal prism as the three-dimensional image before edited, and FIG. 1(b) shows a pentagonal prism as the three-dimensional image after edited.

The editing operation is carried out by specifying two planes indicated by oblique lines, which are element figures to be edited in the three-dimensional image, and moving the specified two planes to the right side of the drawing. As a result of this operation, the specified element figures are moved to the right, and image editing to deform and elongate four surfaces connected to the moved element figures in the right direction is performed.

Such a method including specifying an element figure and performing editing operations, such as move and rotation, is disclosed, for example, in Japanese Patent Application Laid-Open No. H6-96177.

However, conventional editing methods such as the method disclosed in the Japanese Patent Application Laid-Open No. H6-96177 have problems of poor operability of editing operations, and consequently have a problem that the possibility of erroneous operation is high in editing a complex three-dimensional image.

Next, examples of erroneous operation which may occur in editing will be explained.

FIG. 2 is an explanatory view showing an editing operation on a three-dimensional image.

FIG. 2 is a view for explaining an editing operation to move a cylindrical portion in a three-dimensional image composed of a rectangular parallelepiped and a cylinder, wherein FIG. 2(a) shows the three-dimensional image before edited and FIG. 2(b) shows the three-dimensional image after edited by erroneous operation.

The editing operation is carried out by specifying inner and outer curved surfaces of the cylinder as an element figure to be edited in the three-dimensional image and moving the specified element figure to the lower right side of the drawing. However, since the outer curved surface of the cylinder is separated into two parts by the rectangular parallelepiped part, it is necessary to specify the left curved surface and the right curved surface in the drawing.

FIG. 2 shows a state of erroneous operation in which only the inner side and left curved surface of the cylinder indicated by oblique lines were specified and the right curved surface was not specified. As shown in FIG. 2(b), only the inner curved surface of the cylinder and the left curved surface of the outer curved surface of the cylinder were moved, and the right curved surface was left in the initial position.

Thus, when editing a complex three-dimensional image, since many element figures need to be specified, it is necessary to repeat the operation of specifying an element figure many times, and consequently there is the problem of poor operability that leads to the problem that erroneous operation due to specification failure will often occur.

Image editing apparatuses having improved operability by specifying a range for a three-dimensional image including a large number of element figures to be specified and specifying all the element figures included completely within the specified range are also widespread.

FIG. 3 is an explanatory view showing an editing operation on a three-dimensional image.

FIG. 3 is a view for explaining an editing operation to move a small rectangular parallelepiped in a three-dimensional image composed of two rectangular parallelepipeds arranged so that the small rectangular parallelepiped is attached as a projecting part to the top surface of the large rectangular parallelepiped, wherein FIG. 3(a) shows the three-dimensional image before edited and FIG. 3(b) shows the three-dimensional image after edited by erroneous operation.

The editing operation is carried out by collectively specifying respective surfaces indicated by oblique lines constituting the small rectangular parallelepiped, which is an element figure to be edited in the three-dimensional image, by a rectangular range indicated by the dotted line.

FIG. 3 shows a state of erroneous operation in which the top surface of the large rectangular parallelepiped which was not intended to be specified was specified because the range indicated by the dotted line was too large, and as shown in FIG. 3(b), the top surface of the large rectangular parallelepiped was also moved together with the small rectangular parallelepiped.

Thus, even when element figures are specified by specifying a range, there is also the problem that erroneous operation will often occur.

It may be possible to group a plurality of element figures to be considered as one element figure in advance. However, in order to relate a plurality of element figures together, it is necessary to perform the operation of specifying element figures to be related, and consequently similar problems arise.

BRIEF SUMMARY OF THE INVENTION

The present invention has been made with the aim of solving the above problems, and it is an object of the present invention to provide an image editing method capable of specifying a plurality of element figures to be related together by a simple operation by retrieving, upon specification of one element figure in a three-dimensional image, other element figures connected to the specified one element figure, or other element figures included in the same three-dimensional image in which the one element figure is included, determining whether or not each of the retrieved other element figures has a specific relationship to the one element figure, and automatically performing the process of relating the other element figure determined as having the specific relationship, to the one element figure, and thereby capable of improving operability and preventing erroneous operation, and also to provide an image editing apparatus adopting the method, a computer program for realizing the apparatus, and a computer-readable memory product storing the program.

An image editing method according to a first aspect of the invention is an image editing method using an image editing apparatus for editing a three-dimensional image including a plurality of element figures, wherein the image editing apparatus retrieves other element figures connected to one element figure, or other element figures included in the same three-dimensional image in which the one element figure is included; determines whether or not each of the retrieved other element figures has a specific relationship to the one element figure; and relates the other element figure determined as having the specific relationship, to the one element figure.

According to the image editing method of the first aspect, in the case where a three-dimensional image including a plurality of element figures such as a quadrangular plane, a curved surface including a ridgeline, and a cylinder is edited using an image editing apparatus such as a three-dimensional CAD apparatus, when one element figure in the three-dimensional image is specified, other element figures connected to the specified one element figure, or other element figures included in the same three-dimensional image in which the one element figure is included are retrieved, and other element figure in the retrieved other element figures, which was determined as having a specific relationship to the one element figure is related to the one element figure. Thus, since a plurality of element figures to be edited in the same manner as the one element figure can be specified by a simple operation in editing the image, it is possible to improve operability and prevent erroneous operation when specifying element figures.

An image editing apparatus according to a second aspect of the invention is an image editing apparatus for editing a three-dimensional image including a plurality of element figures, and comprises: means for receiving specification of an element figure; means for retrieving element figures connected to the specified element figure, or element figures included in the same three-dimensional image in which the specified element figure is included; means for determining whether or not each of the retrieved element figures has a specific relationship to the specified element figure; and means for relating the element figure determined as having the specific relationship, to the specified element figure.

In the image editing apparatus of the second aspect, when editing a three-dimensional image including a plurality of element figures such as a quadrangular plane, a curved surface including a ridgeline, and a cylinder, the image editing apparatus performs the process of relating other element figure determined as having a specific relationship to the specified one element figure to the one element figure. Thus, since a plurality of element figures to be edited in the same manner as the one element figure can be specified by a simple operation in editing the image, it is possible to improve operability and prevent erroneous operation when specifying element figures.

An image editing apparatus according to a third aspect of the invention is an image editing apparatus for editing a three-dimensional image including a plurality of element figures, and comprises: means for receiving specification of an element figure; means for retrieving element figures connected to the specified element figure; means for determining whether or not each of the retrieved element figures is a curved surface including ridgelines between the specified element figure and other element figure; and means for relating the element figure determined as being a curved surface including ridgelines to the specified element figure.

In the image editing apparatus of the third aspect, if an element figure connected to the specified element figure is determined as being a curved surface including ridgelines between the specified element figure and other element figure, that is, a so-called fillet, the process of relating the element figure determined as being a curved surface including ridgelines to the specified element figure is performed. Thus, since a curved surface including ridgelines is automatically specified by just specifying an element figure, it is possible to simplify the operation of specifying element figures and improve operability. Moreover, since the operation is simplified, it is possible to prevent erroneous operation when specifying element figures.

An image editing apparatus according to a fourth aspect of the invention is an image editing apparatus for editing a three-dimensional image including a plurality of element figures, and comprises: means for receiving specification of an element figure; means for retrieving element figures connected to the specified element figure; means for determining whether or not each of the retrieved element figures is a surface connected to the specified element figure in a tangent continuous manner; and means for relating the element figure determined as being a surface connected in a tangent continuous manner to the specified element figure.

In the image editing apparatus of the fourth aspect, if an element figure connected to the specified element figure is determined as having a surface connected smoothly to the specified element figure in a tangent continuous manner, so-called G1 continuity, the process of relating the element determined as being connected in a tangent continuous manner to the specified element figure is performed. Thus, by just specifying an element figure, since other element figure connected in a tangent continuous manner is automatically specified, it is possible to simplify the operation of specifying element figures and improve operability. Moreover, since the operation is simplified, it is possible to prevent erroneous operation when specifying element figures.

An image editing apparatus according to a fifth aspect of the invention is based on the fourth aspect, and further comprises: means for further retrieving element figures connected to the element figure related to the specified element figure; means for determining whether or not each of the further retrieved element figures is the specified element figure or the element figure related to the specified element figure; means for determining whether or not the further retrieved element figure is a surface connected in a tangent continuous manner to the element figure related to the specified element figure, if the further retrieved element figure is determined as not being the specified element figure or the element figure related to the specified element figure; and means for relating the element figure determined as being a surface connected in a tangent continuous manner to the specified element figure.

In the image editing apparatus of the fifth aspect, by further performing the process of relating a further element figure connected in a tangent continuous manner to the element figure determined as being connected to the specified element figure in a tangent continuous manner to the initially specified element figure one after another, it is possible to improve operability and prevent erroneous operation even when editing a three-dimensional image having complex curved surfaces.

An image editing apparatus according to a sixth aspect of the invention is an image editing apparatus for editing a three-dimensional image including a plurality of element figures, and comprises: means for receiving specification of an element figure; means for retrieving other element figures included in the same three-dimensional image in which the specified element figure is included; means for determining whether or not the retrieved element figures have the same center as the specified element figure; and means for relating the element figure determined as having the same center to the specified element figure.

In the image editing apparatus of the sixth aspect, if an element figure included in the same three-dimensional image in which the specified element figure is included is determined as having the same center as the specified element figure, the process of relating the element figure determined as having the same center to the specified element figure is performed. Thus, by just specifying an element figure, since other element figure connected in a tangent continuous manner is automatically specified, it is possible to simplify the operation of specifying element figures and improve operability. Moreover, since the operation is simplified, it is possible to prevent erroneous operation when specifying element figures.

An image editing apparatus according to a seventh aspect of the invention is based on the sixth aspect, wherein if the specified element figure is spherical in shape, the center is the center of the sphere.

In the image editing apparatus of the seventh aspect, if the specified element figure is spherical in shape, a spherical element figure having the same center as the sphere that is the specified element figure is related, and thus it is possible to simplify the operation of specifying a spherical element figure and improve operability. Moreover, since the operation is simplified, it is possible to prevent erroneous operation when specifying element figures.

An image editing apparatus according to an eighth aspect of the invention is based on the sixth aspect, wherein if the specified element figure has a center axis, the center is the center axis.

In the image editing apparatus of the eighth aspect, if the specified element figure is an element figure having a center axis, such as a cylindrical, columnar or conical element figure, an element figure having the same center axis as the center axis of the specified element figure is related, and thus it is possible to simplify the operation of specifying element figures, such as cylindrical, columnar and conical element figures, and improve operability. Moreover, since the operation is simplified, it is possible to prevent erroneous operation when specifying element figures.

An image editing apparatus according to a ninth aspect of the invention is an image editing apparatus for editing a three-dimensional image including a plurality of element figures, and comprises: means for receiving specification of first and second element figures; means for retrieving element figures connected to the specified first element figure; means for determining whether or not each of the retrieved element figures is the specified second element figure; means for relating the element figure determined as not being the second element figure to the first element figure; and means for retrieving element figures which are connected to the element figure related to the first element figure and are not the first element figure or the element figure related to the first element figure.

In the image editing apparatus of the ninth aspect, element figures connected directly or indirectly to the specified first element figure are retrieved, and if the retrieved element figure is determined as not being the second element figure, it is related to the first element figure. Thus, since a three-dimensional image including the first element figure as a projecting part or a hollow part with respect to the second element figure functioning as a reference surface can be related at a time, it is possible to improve operability. Moreover, since the operation is simplified, it is possible to prevent erroneous operation when specifying element figures.

An image editing apparatus according to a tenth aspect of the invention is an image editing apparatus for editing a three-dimensional image including a plurality of element figures having a normal vector, and comprises: means for receiving specification of an element figure; means for retrieving other element figures included in the same three-dimensional image in which the specified element figure is included; means for determining whether or not each of the retrieved element figures has a normal vector parallel to that of the specified element figure; means for determining whether or not a direction of the normal vector of the element figure determined as having parallel normal vector is opposite to that of the specified element figure; means for determining whether a distance from the specified element figure to the element figure determined as having the normal vector pointing in the opposite direction is equal to or less than a predetermined value; and means for relating the element figure determined as being at the distance equal to or less than the predetermined value to the specified element figure.

In the image editing apparatus of the tenth aspect, element figures included in the same three-dimensional image in which the specified element figure is included are retrieved, and if the retrieved element figure is determined as having a normal vector parallel and pointing in a direction opposite to that of the specified element figure and if the distance between the retrieved element figure and the specified element figure is not more than the predetermined value, then the retrieved element figure is related to the specified element figure. Thus, since the element figures having a shell relationship to the specified element figure can be automatically specified, it is possible to improve operability. Moreover, since the operation is simplified, it is possible to prevent erroneous operation when specifying element figures.

An image editing apparatus according to an eleventh aspect of the invention is based on any one of the second through tenth aspects, and further comprises: means for receiving an operation to edit the specified element figure; and means for editing the specified element figure and the element figures related to the specified element figure, based on the received operation.

In the image editing apparatus of the eleventh aspect, since the specified element figure and the element figures related to the specified element figure are edited collectively based on the received operation, it is possible to improve operability and prevent erroneous operation when specifying element figures.

An image editing apparatus according to a twelfth aspect of the invention is based on any one of the second through eleventh aspects, and further comprises: means for discriminating a type of editing based on the received operation; and means for determining whether or not it is necessary to perform relating with respect to the specified element figure, based on the discriminated type.

In the image editing apparatus of the twelfth aspect, since a determination as to whether or not it is necessary to perform a relating process with respect to the specified element figure is made automatically based on a type of operation, such as move, offset, change of the radius, and delete, the operator can execute a simplified process for specifying element figures without performing special operations, and therefore it is possible to improve operability.

A computer program according to a thirteenth aspect of the invention is a computer program for causing a computer to edit a three-dimensional image including a plurality of element figures, and comprises the steps of upon receipt of specification of an element figure, causing a computer to retrieve element figures connected to the specified element figure, or element figures included in the same three-dimensional image in which the specified element figure is included; causing the computer to determine whether or not each of the retrieved element figures has a specific relationship to the specified element figure; and causing the computer to relate the element figure determined as having the specific relationship, to the specified element figure.

If the computer program of the thirteenth aspect is executed by a computer such as a general-purpose computer for use as a three-dimensional CAD apparatus, the computer operates as an image editing apparatus, and when editing a three-dimensional image including a plurality of element figures, such as a quadrangular plane, a curved surface including a ridgeline, and a cylinder, it performs the process of relating other element figure determined as having a specific relationship to specified one element figure to the one element figure. Thus, since a plurality of element figures to be edited in the same manner as the one element figure can be specified by a simple operation in editing the image, it is possible to improve operability and prevent erroneous operation when specifying element figures.

A computer-readable memory product according to a fourteenth aspect of the invention is a computer-readable memory product storing a computer program for causing a computer to edit a three-dimensional image including a plurality of element figures, wherein the computer program comprises the steps of upon receipt of specification of an element figure, causing a computer to retrieve element figures connected to the specified element figure, or element figures included in the same three-dimensional image in which the specified element figure is included; causing the computer to determine whether or not each of the retrieved element figures has a specific relationship to the specified element figure; and causing the computer to relate the element figure determined as having the specific relationship, to the specified element figure.

If the computer program stored in the computer-readable memory product of the fourteenth aspect is executed by a computer such as a general-purpose computer for use as a three-dimensional CAD apparatus, the computer operates as an image editing apparatus, and when editing a three-dimensional image including a plurality of element figures, such as a quadrangular plane, a curved surface including a ridgeline, and a cylinder, it performs the process of relating other element figure determined as having a specific relationship to the specified one element figure to the one element figure. Thus, since a plurality of element figures to be edited in the same manner as the one element figure can be specified by a simple operation in editing the image, it is possible to improve operability and prevent erroneous operation when specifying element figures.

The above and further objects and features of the invention will more fully be apparent from the following detailed description with accompanying drawings.

BRIEF DESCRIPTION OF THE SEVERAL VIEWS OF THE DRAWINGS

FIG. 6 is an explanatory view showing the concept of a table stored in the image editing apparatus of the present invention;

DETAILED DESCRIPTION OF THE INVENTION

Figure 1:
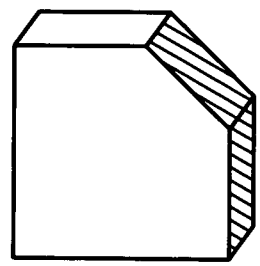
FIG. 1 is an explanatory view showing an editing operation on a three-dimensional image.
Figure 1:
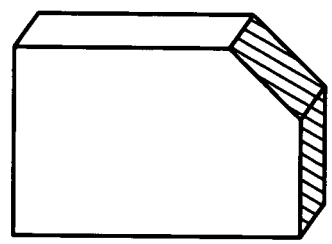

The following description will explain in detail the present invention, based in the drawings illustrating some embodiments thereof.

Figure 4:
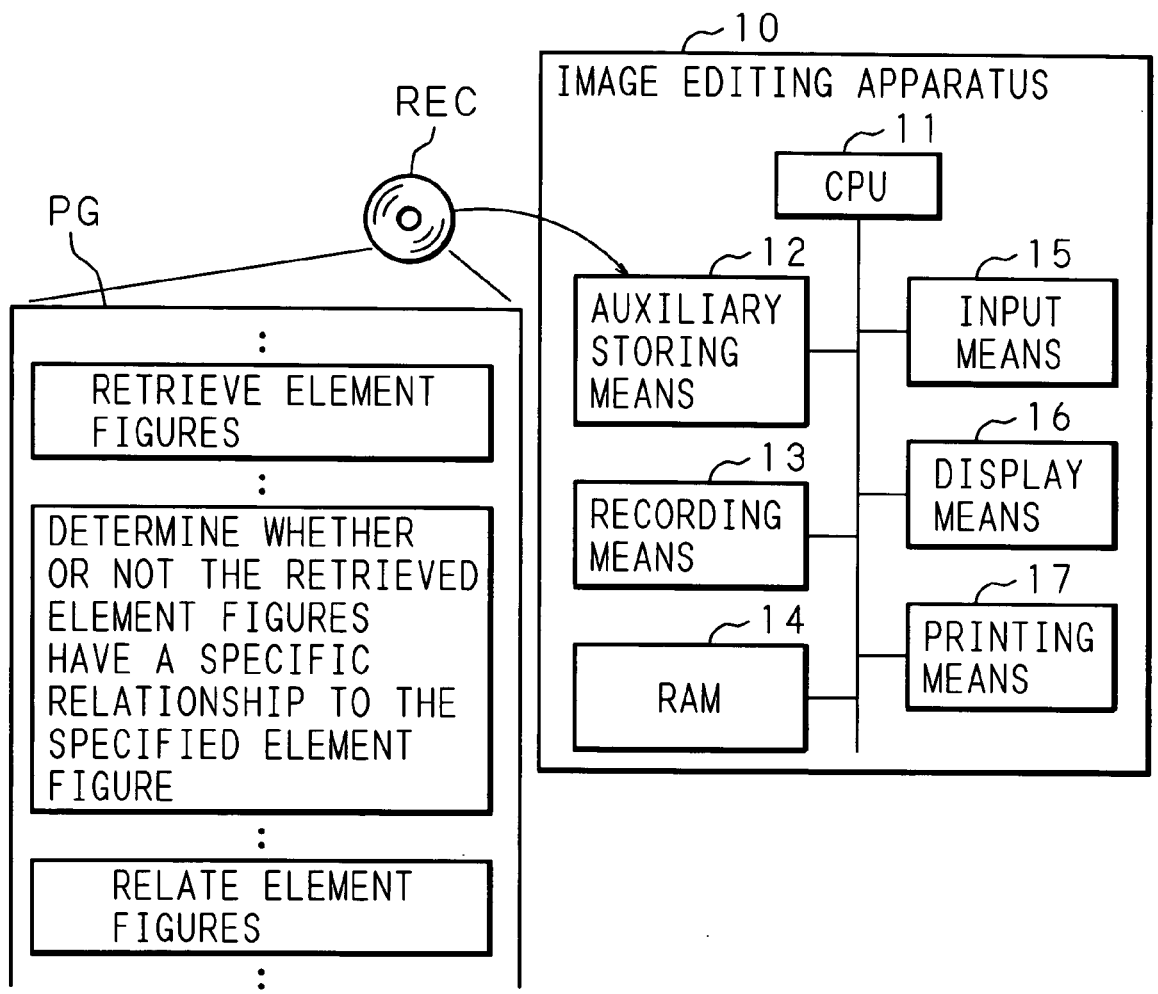
FIG. 4 is a block diagram showing the structure of an image editing apparatus of the present invention.

FIG. 4 is a block diagram showing the structure of an image editing apparatus of the present invention.

The numeral 10 in FIG. 4 is an image editing apparatus such as a three-dimensional CAD (Computer-Aided Design) apparatus used for creating and editing a three-dimensional image including a plurality of element figures, such as a quadrangular plane, a curved surface including ridgelines (fillet), and a cylinder. The image editing apparatus 10 is constructed using a computer such as a general-purpose computer, and comprises auxiliary storing means 12 such as a CD-ROM drive for reading various types of information from a memory product REC such as a CD-ROM storing information, such as a computer program PG for the image editing apparatus of the present invention, and data; and recording means 13 such as a hard disk for storing information read by the auxiliary storing means 12.

By reading various types of information such as the computer program PG of the present invention and data from the recording means 13 and executing the information by a CPU 11 after storing it in a RAM 14 for temporarily storing information, the general-purpose computer operates as the image editing apparatus 10 of the present invention.

The recording means 13 stores not only the computer program PG of the present invention, but also a computer program for three-dimensional CAD used for creating and editing a three-dimensional image composed of element figures. The computer program PG of the present invention is used as a tool for assisting an editing operation on a three-dimensional image created by the processes of the computer program for three-dimensional CAD.

In other words, since the computer program PG of the present invention is a module program that forms a part of the computer program for three-dimensional CAD, these computer programs will be explained as the computer program PG without particularly distinguishing them from each other in the following explanation.

The CPU 11 may be constructed as one chip, but if it is combined with a special processor such as an imaging processor, it is possible to realize high-speed processing.

Further, the image editing apparatus 10 comprises input means 15 such as a mouse, a tablet and a keyboard for receiving inputs such as specification of an element figure and an operation to edit a three-dimensional image; display means 16 such as a monitor; and printing means 17 such as a printer and a plotter.

Next, the processes performed by the image editing apparatus 10 of the present invention will be explained.

Figure 5:
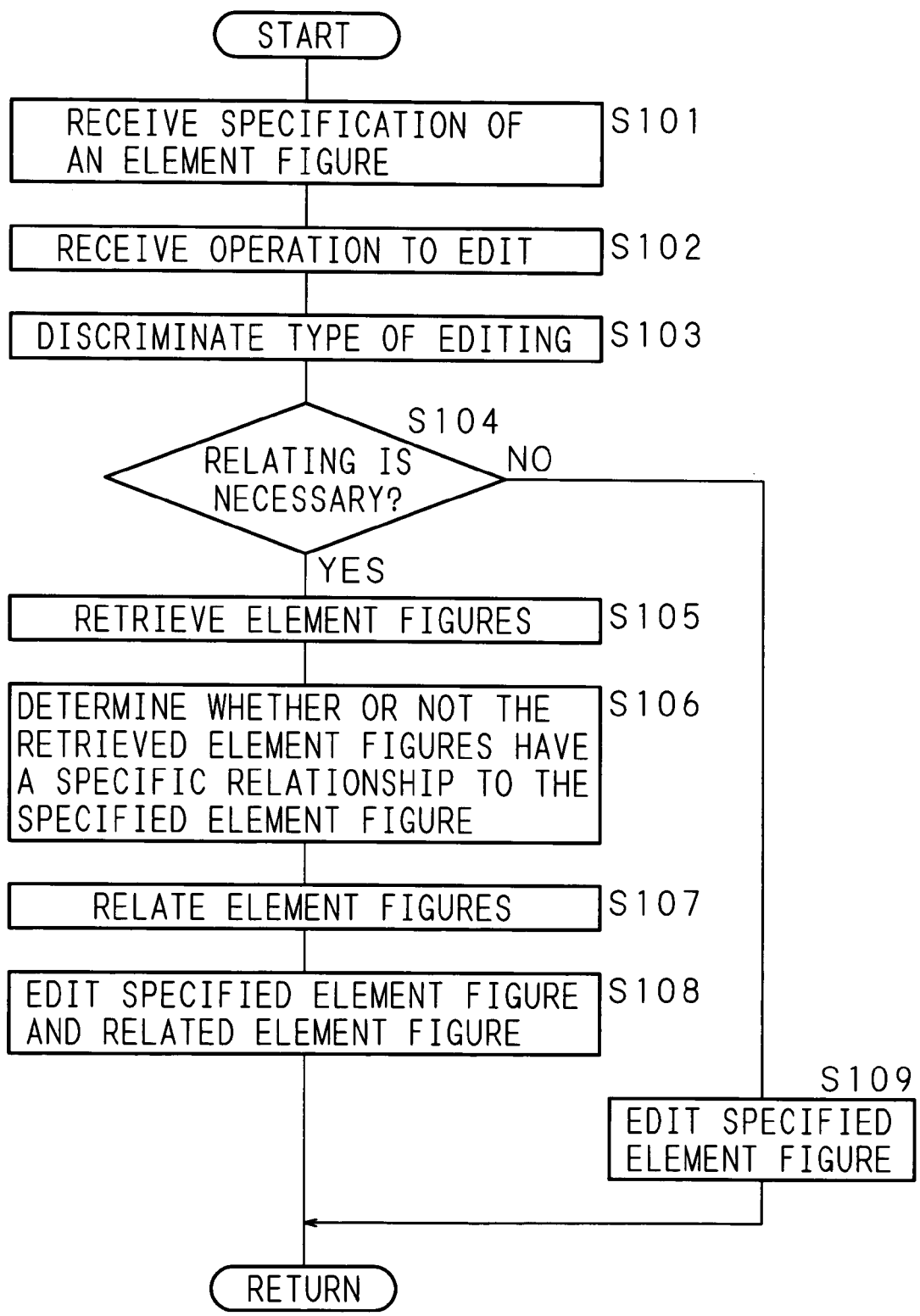
FIG. 5 is a flowchart showing the processes to be performed by the image editing apparatus of the present invention.

FIG. 5 is a flowchart showing the processes to be performed by the image editing apparatus 10 of the present invention.

An operator who performs an editing operation on a three-dimensional image by using the image editing apparatus 10 specifies an element figure included in the three-dimensional image by the input means 15, and inputs an operation to edit the specified element figure by a method such as move, for example, an operation specifying a direction and distance of moving the element figure.

In the image editing apparatus 10, under the control of the CPU 11 executing the computer program PG stored in the RAM 14, specification of an element figure is received (S101), an operation to edit the specified element figure is received (S102), a type of editing based on the received operation is discriminated (S103), and a determination is made, based on the discriminated type, as to whether or not it is necessary to perform relating with respect to the specified element figure (S104).

In step S104, if the image reading apparatus 10 determines that it is necessary to perform relating with respect to the specified element figure (S104: YES), then under the control of the CPU 11 executing the computer program PG stored in the RAM 14, the image reading apparatus 10 retrieves element figures connected to the specified element figure, or element figures included in the same three-dimensional image in which the specified element figure is included (S105), determines whether or not the retrieved element figures have a specific relationship to the specified element figure (S106), and relates the element figure determined as having the specific relationship, to the specified element figure (S107).

In the image editing apparatus 10, under the control of the CPU 11 executing the computer program PG stored in the RAM 14, the element figure specified in step S101 and the element figures related in step S107 are edited based on the operation received in step S102 (S108).

In step S104, if the image editing apparatus 10 determines that it is not necessary to perform relating with respect to the specified element figure (S104: NO), then under the control of the CPU 11 executing the computer program PG stored in the RAM 14, it edits the element figure specified in step S101, based on the operation received in step S102 (S109).

The process performed in steps S104 through S107 to relate other element figures to the specified one element figure is the process of relating other element figures to the specified one element figure which is performed when other element figures retrieved with respect to the one element figure are element figures having a specific relationship to the one element figure, such as element figures constructed to form curved surfaces including ridgelines called fillets, element figures having a surface connected in a tangent continuous manner called G1 continuity, spherical and cylindrical element figures having the same center, element figures forming the same projecting part or hollow part, and element figures having a shell relationship. With this process, the editing operation is simplified.

Moreover, standard relating types are set for respective operations in advance, and the image editing apparatus 10 determines whether or not it is necessary to perform each type of relating process in step S104.

The standard relating types are stored in the form of an initial file, a table or the like in the recording means 13 in advance. In step 104, with reference to the table, for example, stored in the recording means 13, a determination is made as to whether or not it is necessary to perform each relating process for the operation.

FIG. 6 is an explanatory view showing the concept of a table stored in the image editing apparatus 10 of the present invention.

FIG. 6 shows types of relating performed for the respective operations. Here, "o" indicates that performing the relating process is set as a standard, "x" indicates that the relating process is not set as a standard but can be specified, and "-" indicates that the relating process cannot be specified.

In the example shown in FIG. 6, for an operation to move the element figure, performing "ridgeline relating", "concentric relating" and "shell relating" is set as standards in advance, and it is possible to perform "tangent continuous relating", "projecting part relating" and "hollow part relating" if specified.

Moreover, in the example shown in FIG. 6, for an operation to change the radius of the element figure, performing "ridgeline relating" is set as a standard, and it is impossible to perform "tangent continuous relating", "concentric relating", "projecting part relating", "hollow part relating" and "shell relating".

Next, the respective types of relating processes will be explained.

First, the process of retrieving an element figure which is a curved surface including ridgelines of two element figures, that is, a so-called fillet, and relating the element figures will be explained.

Figure 7:
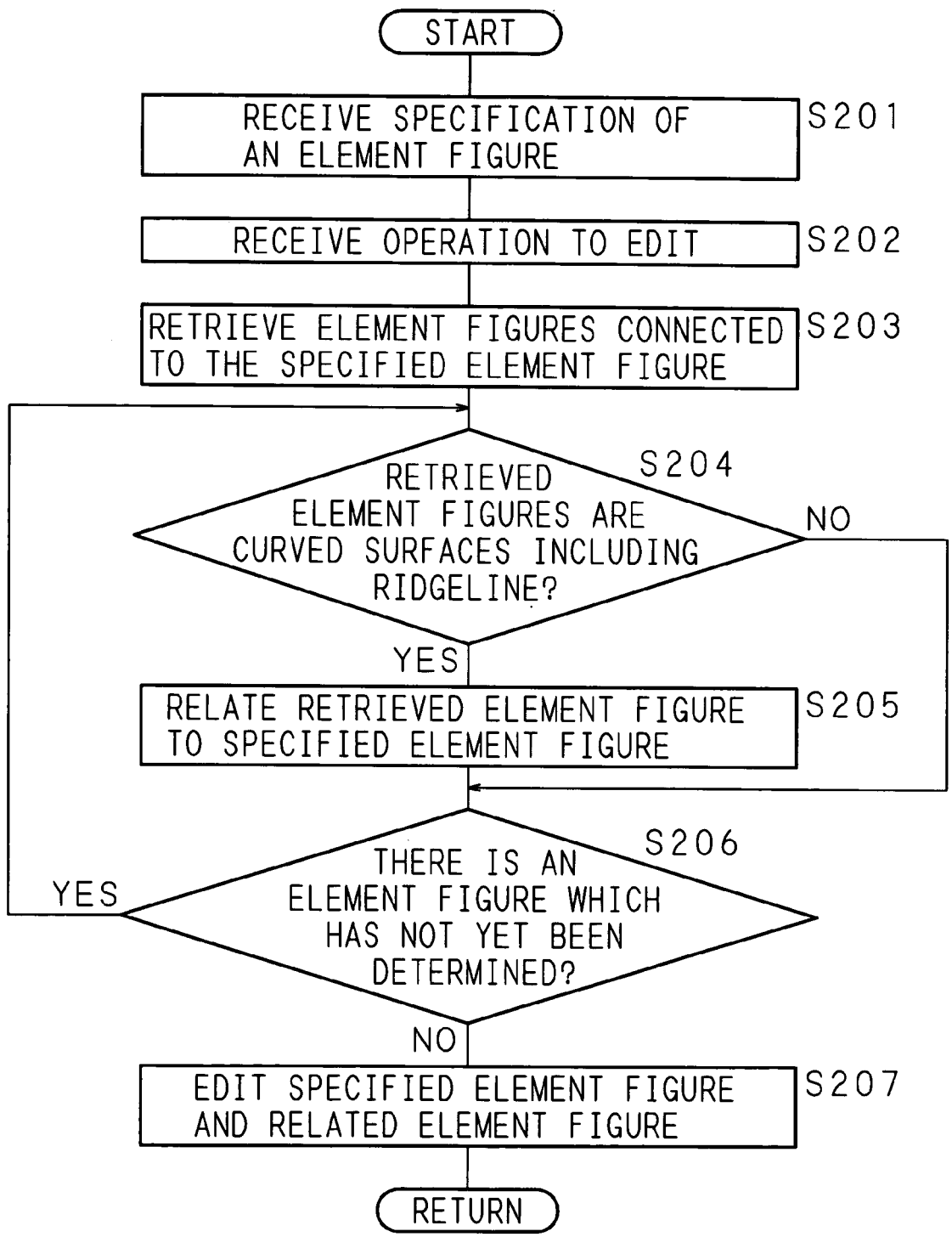
FIG. 7 is a flowchart showing the ridgeline relating process performed by the image editing apparatus of the present invention.

FIG. 7 is a flowchart showing the ridgeline relating process performed by the image editing apparatus 10 of the present invention.

The operator specifies an element figure included in a three-dimensional image by the input means 15, and inputs an operation to edit the specified element figure by a method such as move, for example, an operation specifying a direction and distance of moving the element figure.

In the image editing apparatus 10, under the control of the CPU 11 executing the computer program PG stored in the RAM 14, specification of an element figure is received (S201), and an operation to edit the specified element figure is received (S202).

Regarding a determination as to whether or not it is necessary to perform relating, suppose that a determination that relating was necessary was made automatically based on the type of the received operation, or manually based on the input of the operator.

In the image editing apparatus 10, under the control of the CPU 11 executing the computer program PG stored in the RAM 14, element figures connected to the specified element figure are retrieved (S203), and a determination is made as to whether or not the retrieved element figures are curved surfaces including ridgelines of the specified element figure and other element figure (S204), and the element figure determined as being a curved surface including ridgelines is related to the specified element figure (S205).

Then, under the control of the CPU 11 executing the computer program PG stored in the RAM 14, the image editing apparatus 10 determines whether or not there is an element figure which has not yet been subjected to a determination as to whether or not it is necessary to perform relating shown in steps S204 and 205 in the element figures retrieved in step S203 (S206). If the image editing apparatus 10 determines that the process of determining whether or not it is necessary to perform relating was performed for all the retrieved element figures (S206: NO), then it edits the element figure specified in step S201 and the element figures related in step S205, based on the operation received in step S202 (S207).

In step S206, if the image reading apparatus 10 determines that there is an element figure which has not yet been subjected to a determination as to whether or not it is necessary to perform relating (S206: YES), then it moves to step S204, and repeats the subsequent processes for the element figure which has not yet been subjected to a determination as to whether or not it is necessary to perform relating.

Figure 8:
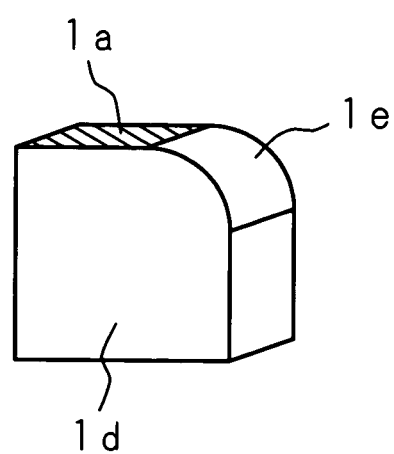
FIG. 8 is a perspective view of a three-dimensional image to be processed by the image editing apparatus of the present invention.
Figure 9:
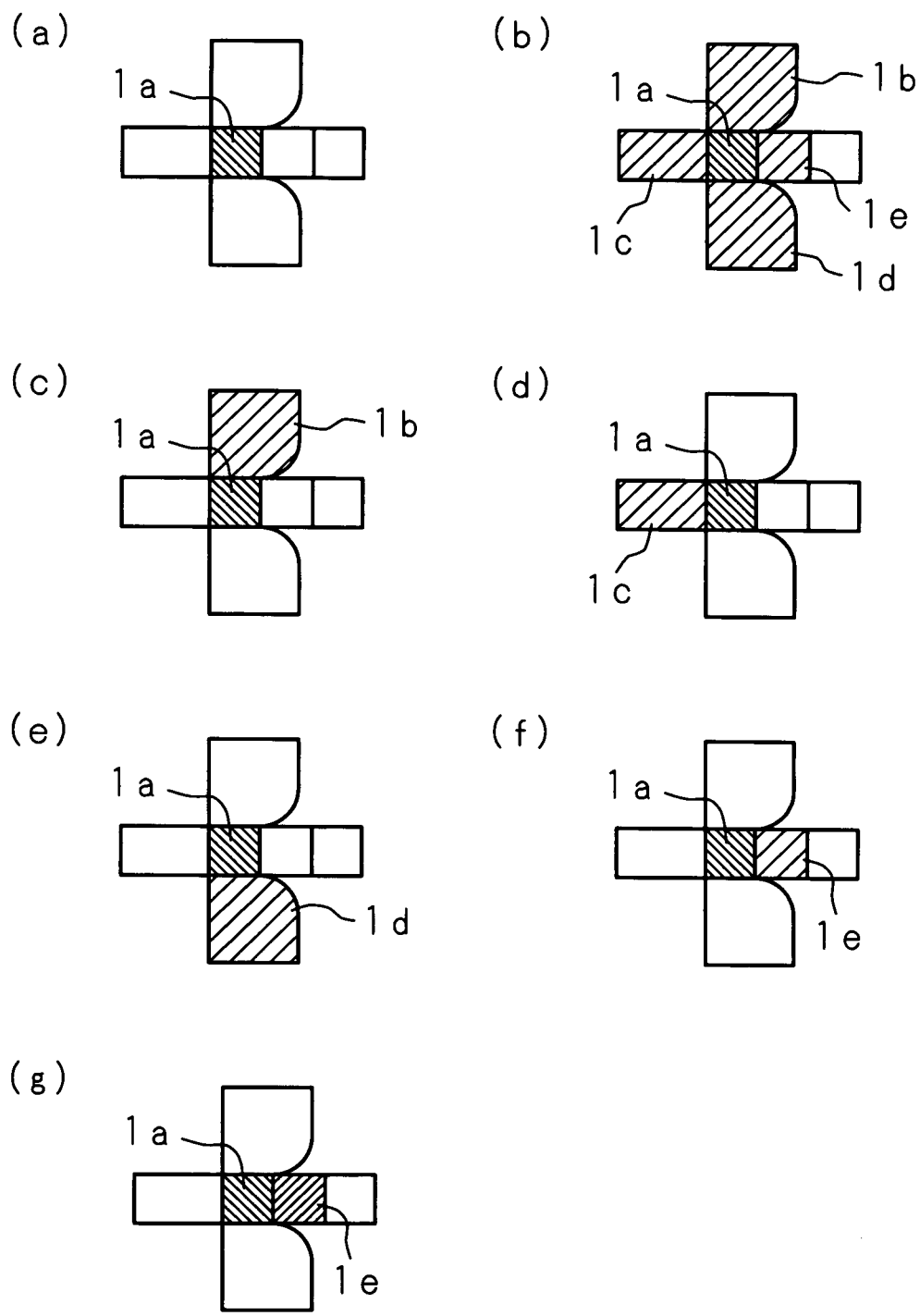
FIG. 9 is an exploded view of the three-dimensional image to be processed by the image editing apparatus of the present invention.

FIG. 8 is a perspective view of a three-dimensional image to be processed by the image editing apparatus 10 of the present invention, and FIG. 9 is an exploded view of the three-dimensional image to be processed by the image editing apparatus 10 of the present invention.

FIG. 8 shows a three-dimensional image to be processed, and the three-dimensional image shown in FIG. 8 is a rectangular parallelepiped in which only the ridgeline on the right side of the top face in the drawing forms a curved surface as a fillet.

FIG. 9 shows an exploded view of the rectangular parallelepiped three-dimensional image shown in FIG. 8.

Suppose that an element FIG. 1a on the top face of the rectangular parallelepiped three-dimensional image was specified in step 201 of the ridgeline relating process explained above using FIG. 7.

FIG. 9(a) shows a state in which the element FIG. 1a on the top face was specified in step S201.

FIG. 9(b) shows a state in which element FIGS. 1b, 1c, 1d and 1e connected to the specified element FIG. 1a were retrieved in step S203 of the ridgeline relating process. FIG. 9(c), FIG. 9(d), FIG. 9(e) and FIG. 9(f) show the state of determining whether or not each of the retrieved element FIGS. 1b, 1c, 1d and 1e is a curved surface including a ridgeline in step S204.

The process of determining whether an element figure is a curved surface including a ridgeline is performed using known techniques.

FIG. 9(g) shows a state in which the element FIG. 1e was determined as being a curved surface including a ridgeline in step S204 of the ridgeline relating process and then related to the element FIG. 1a in step S205.

The element FIG. 1e related to the element FIG. 1a is edited together with the element FIG. 1a, based on the editing operation with respect to the element FIG. 1a.

Figure 10:
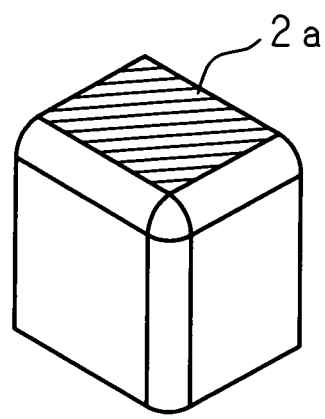
FIG. 10 is a perspective view of a three-dimensional image to be processed by the image editing apparatus of the present invention.
Figure 10:
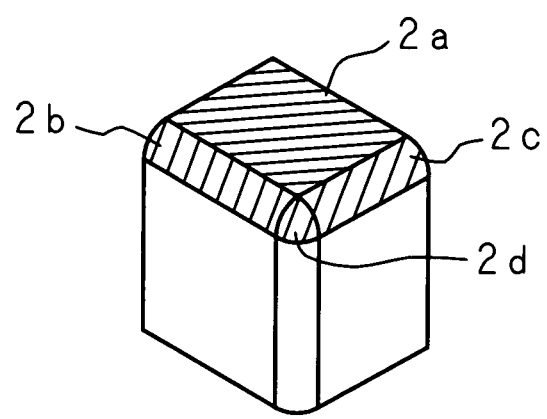

FIG. 10 is a perspective view of a three-dimensional image to be processed by the image editing apparatus 10 of the present invention.

FIG. 10 shows a three-dimensional image to be processed, and the three-dimensional image shown in FIG. 10 is a rectangular parallelepiped in which all ridgelines and vertices form curved surfaces as fillets.

Figure 2:
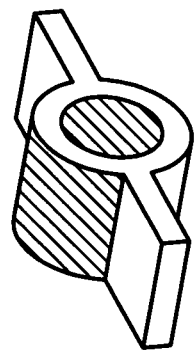
FIG. 2 is an explanatory view showing an editing operation on a three-dimensional image.
Figure 2:
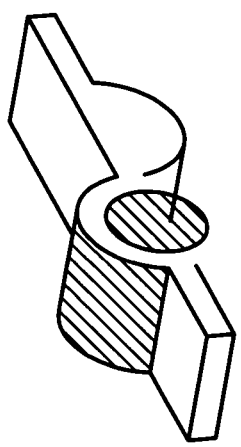

In such a three-dimensional image, if an element FIG. 2a on the top face is specified as shown in FIG. 10(a), element FIGS. 2b, 2c and 2d connected to the element FIG. 2a are retrieved as shown FIG. 10(b), determined to be curved surfaces forming the ridgelines or vertices, and related to the element FIG. 2a.

Needless to say, retrieving, determination and relating are also performed for the ridgelines and vertices in a direction which are not shown in FIG. 10.

Next, the following description will explain the process of continuously retrieving surfaces connected smoothly to a specified element figure in a tangent continuous manner, so-called G1 continuity, and relating them with the specified element figure.

Figure 11:
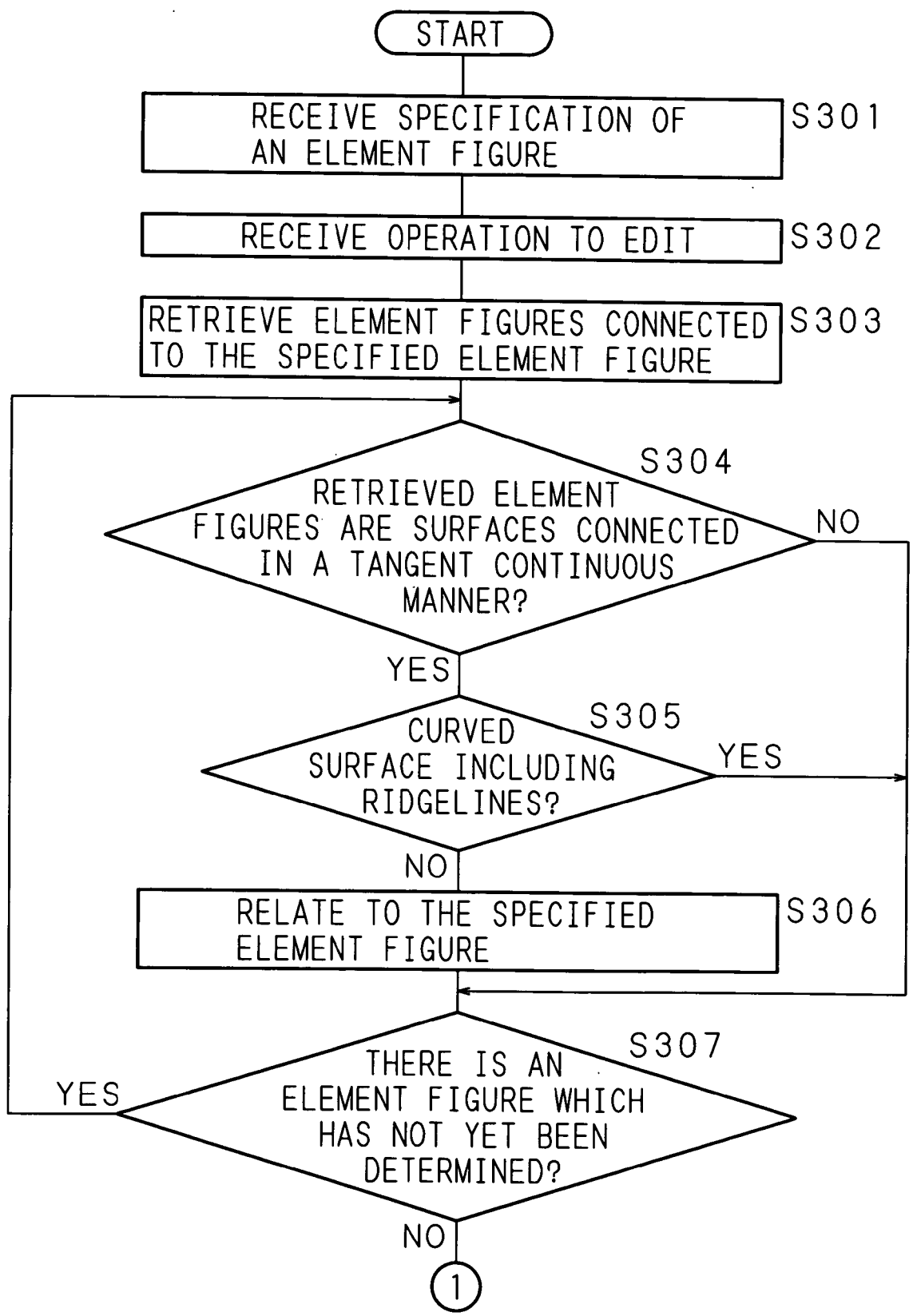
FIG. 11 is a flowchart showing the tangent continuous relating process performed by the image editing apparatus of the present invention.
Figure 12:
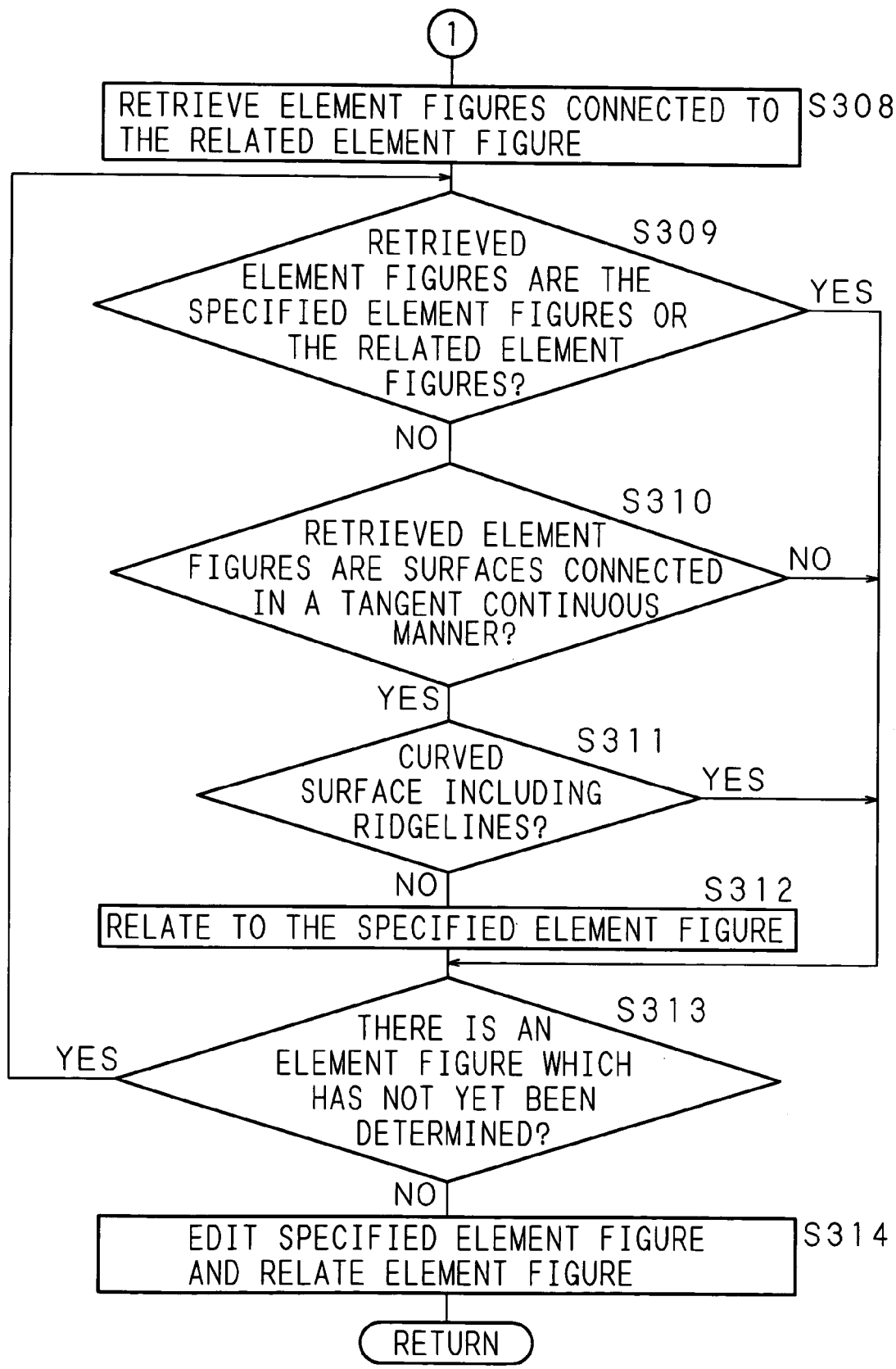
FIG. 12 is a flowchart showing the tangent continuous relating process performed by the image editing apparatus of the present invention.

FIG. 11 and FIG. 12 are a flowchart showing the tangent continuous relating process performed by the image editing apparatus 10.

The operator specifies an element figure included in a three-dimensional image by the input means 15, and inputs an operation to edit the specified element figure by a method such as move, for example, an operation specifying a direction and distance of moving the element figure.

In the image editing apparatus 10, under the control of the CPU 11 executing the computer program PG stored in the RAM 14, specification of an element figure is received (S301), and an operation to edit the specified element figure is received (S302).

Regarding a determination as to whether or not it is necessary to perform relating, suppose that a determination that relating was necessary was made automatically based on the type of the received operation, or manually based on the input of the operator.

In the image editing apparatus 10, under the control of the CPU 11 executing the computer program PG stored in the RAM 14, element figures connected to the specified element figure are retrieved (S303), and a determination is made as to whether or not the retrieved element figures are surfaces connected to the specified element figure in a tangent continuous manner (S304).

In step S304, if the retrieved element figure is determined as being a surface connected to the specified element figure in a tangent continuous manner (S304: YES), then under the control of the CPU 11 executing the computer program PG stored in the RAM 14, the image editing apparatus 10 determines whether or not the element figure determined as being a surface connected to the specified element figure in a tangent continuous manner is a curved surface including ridgelines formed as a fillet (S305), and if the surface connected in a tangent continuous manner is determined as not being a curved surface including ridgelines formed as a fillet (S305: NO), relates the element figure determined as being not a curved surface including ridgelines but a surface connected in a tangent continuous manner to the specified element figure (S306).

The determination as to whether or not the surface connected in a tangent continuous manner is a curved surface including ridgelines formed as a fillet is made by comparing the radius of the curved surface with a preset threshold value or a threshold value inputted by the operator. If the radius of the curved surface is smaller than the threshold value, the surface is determined to be a fillet, and relating is not performed. On the other hand, if the radius of the curved surface is greater than the threshold value, the surface is determined to be a surface smoothly connected with G1 continuity, and relating is performed.

Under the control of the CPU 11 executing the computer program PG stored in the RAM 14, the image editing apparatus 10 determines whether or not there is an element figure which has not yet been subjected to a determination as to whether or not it is necessary to perform relating shown in steps S304 through S306 in the element figures retrieved in step S303 (S307). If the image editing apparatus 10 determines that there is an element figure which has not yet been subjected to a determination as to whether or not it is necessary to perform relating in the element figures retrieved in step S303 (S307: YES), then it moves to step S304 and repeats the subsequent processes on the element figure which has not yet been subjected to a determination as to whether or not it is necessary to perform relating.

In step S304, if the image editing apparatus 10 determines that the retrieved element figure is not a surface connected to the specified element figure in a tangent continuous manner (S304: NO), or in step S305, if the image editing apparatus 10 determines that the element figure determined as being a surface connected to the specified element figure in a tangent continuous manner is a curved surface including ridgelines formed as a fillet (S305: YES), then it moves to step S307 and determines whether or not there is an element figure which has not yet been subjected to a determination as to whether or not it is necessary to perform relating.

In step S307, if the image editing apparatus 10 determines that a determination as to whether or not it is necessary to perform relating was made for all the element figures (S307: NO), then under the control of the CPU 11 executing the computer program PG stored in the RAM 14, the image editing apparatus 10 further retrieves element figures connected to the element figure related to the specified element figure (S308), and determines whether or not each of the further retrieved element figures is the specified element figure or the element figure related to the specified element figure (S309).

In step S309, if the further retrieved element figure is determined as not being the specified element figure or the element figure related to the specified element figure (S309: NO), then under the control of the CPU 11 executing the computer program PG stored in the RAM 14, the image editing apparatus 10 determines whether or not the further retrieved element figure is a surface connected in a tangent continuous manner to the element figure related to the specified element figure (S310).

In step S310, if the retrieved element figure is determined as a surface connected in a tangent continuous manner (S310: YES), then under the control of the CPU 11 executing the computer program PG stored in the RAM 14, the image editing apparatus 10 determines whether or not the element figure determined as being a surface connected in a tangent continuous manner is a curved surface including ridgelines formed as a fillet (S311). If the surface connected in a tangent continuous manner is determined as not being a curved surface including ridgelines formed as a fillet (S311: NO), then the element figure which was determined as not being a curved surface including ridgelines but a surface connected in a tangent continuous manner is related to the specified element figure (S312).

Then, under the control of the CPU 11 executing the computer program PG stored in the RAM 14, the image editing apparatus 10 determines whether or not there is an element figure which has not yet been subjected to a determination as to whether or not it is necessary to perform relating shown in steps S309 through S312 in the element figures retrieved in step S308 (step S313), and if YES (S313: YES), it moves to step S308 and repeats the subsequent processes.

Note that since the process of determining whether or not it is necessary to perform relating shown in steps S309 through S312 is performed not only for the element figures related in step S306, but also for element figures connected to the related element figures in step S312, the process is repeated as long as there is an element figure connected in a tangent continuous manner from the specified element figure, and all element figures connected directly or indirectly to the specified element figure in a tangent continuous manner are related to the specified element figure.

If the retrieved element figure is determined as being the specified element figure or the element figure related to the specified element figure in step S309 (S309: YES), if the further retrieved element figure is determined as not being a surface connected in a tangent continuous manner to the element figure related to the specified element figure in step S310 (S310: NO), or if the element figure determined as being a surface connected in a tangent continuous manner is determined as a curved surface including ridgelines formed as a fillet in step S311 (S311: YES), then the image editing apparatus 10 moves to step S313 and determines whether or not there is an element figure which has not yet been subjected to a determination as to whether or not it is necessary to perform relating.

In step S313, if the image editing apparatus 10 determines that a determination as to whether or not it is necessary to perform relating was made for all the element figures retrieved in step S308 (S313: NO), then under the control of the CPU 11 executing the computer program PG stored in the RAM 14, the image editing apparatus 10 edits the element figure specified in step S301 and the element figures related in steps S306 and S312, based on the operation received in step S302 (S314).

Figure 13:
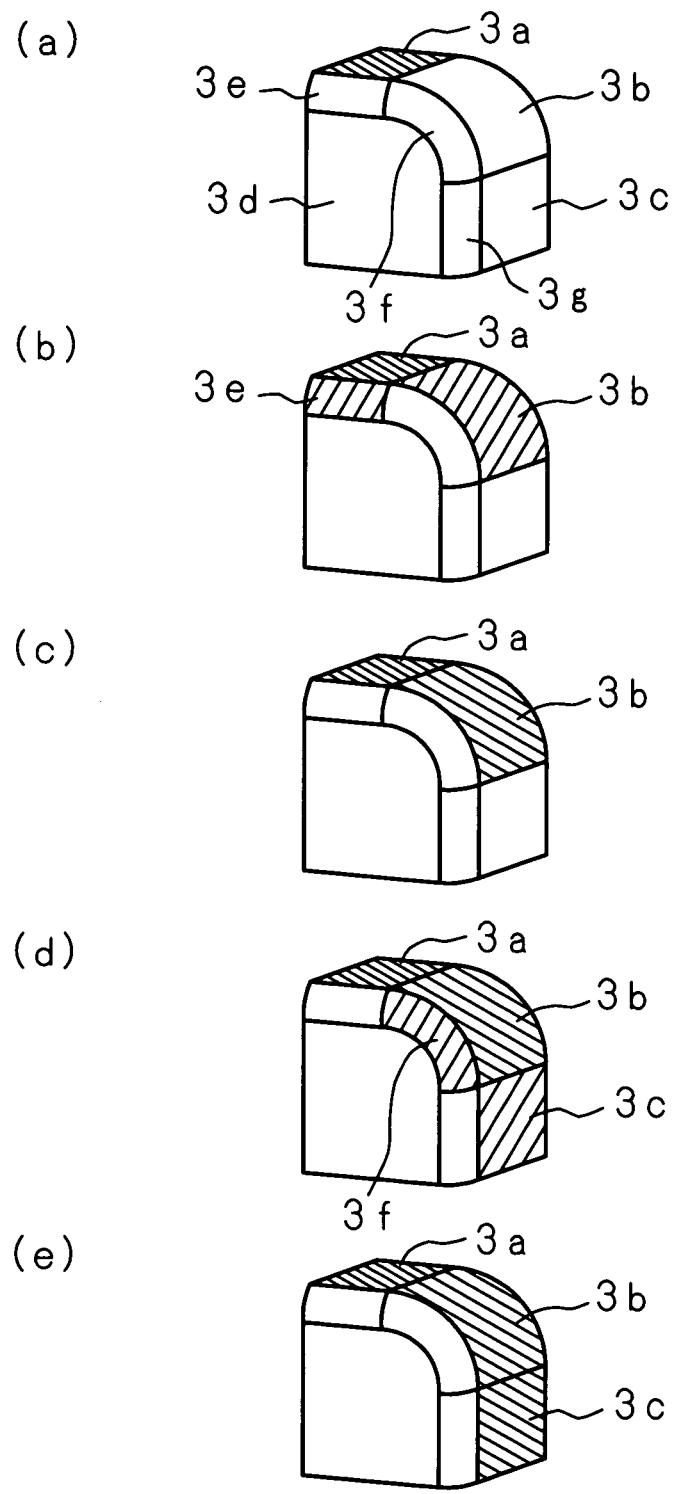
FIG. 13 is a perspective view of a three-dimensional image to be processed by the image editing apparatus of the present invention.

FIG. 13 is a perspective view of a three-dimensional image to be processed by the image editing apparatus 10 of the present invention.

Figure 3:
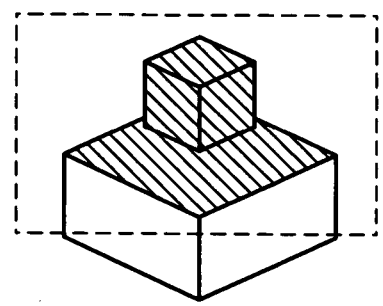
FIG. 3 is an explanatory view showing an editing operation on a three-dimensional image.
Figure 3:
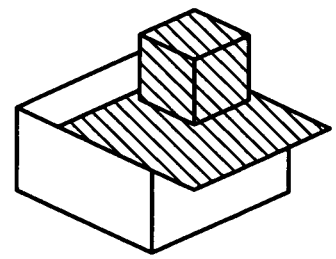

FIG. 13 shows a three-dimensional image to be processed, and the three-dimensional image shown in FIG. 13 is a parallelepiped in which an element FIG. 3a on the top face in the drawing and an element FIG. 3c on the right side in the drawing are connected in a tangent continuous manner through an element FIG. 3b which is a curved surface connected with G1 continuity.

Moreover, element FIGS. 3e, 3f and 3g, which are curved surfaces including ridgelines between an element FIG. 3d of a surface on the front side in the drawing and the element FIGS. 3a, 3b and 3c, are fillets.

First, suppose that the element FIG. 3a on the top face of the three-dimensional image was specified in step S301 of the tangent continuous relating process explained using FIG. 11 and FIG. 12.

FIG. 13(a) shows a state in which the quadrangular element FIG. 3a on the top face was specified in step S301.

FIG. 13(b) shows a state in which the element FIGS. 3b and 3e connected to the specified element FIG. 3a were retrieved in step S303 of the tangent continuous relating process. FIG. 13(c) shows a state in which the element FIG. 3b retrieved in steps S304 through S306 was determined as being a surface connected in a tangent continuous manner but not a curved surface including ridgelines formed as a fillet, and then related to the element FIG. 3a.

FIG. 13(d) shows a state in which the element FIGS. 3c and 3f connected to the related element FIG. 3b were further retrieved in step S308 of the tangent continuous relating process. FIG. 13(e) shows a state in which the element FIG. 3c retrieved in steps S309 through S312 of the tangent continuous relating process was determined as being a surface connected to the element FIG. 3b in a tangent continuous manner but not a curved surface including ridgelines formed as a fillet, and then related to the element FIG. 3a.

Thus, the surfaces connected directly or indirectly to the specified element FIG. 3a in a tangent continuous manner are related one after another to the element FIG. 3a, and the element FIGS. 3b and 3c related to the element FIG. 3a are edited together with the element FIG. 3a based on an editing operation with respect to the element FIG. 3a.

Needless to say, the same processes are also performed for element figures lying in a direction which is not shown in FIG. 13.

Next, the following description will explain the processes of retrieving element figures which are included in the same three-dimensional image in which the specified element figure is included and have the same center as the specified element figure and relating the retrieved element figures to the specified element figure.

Figure 14:
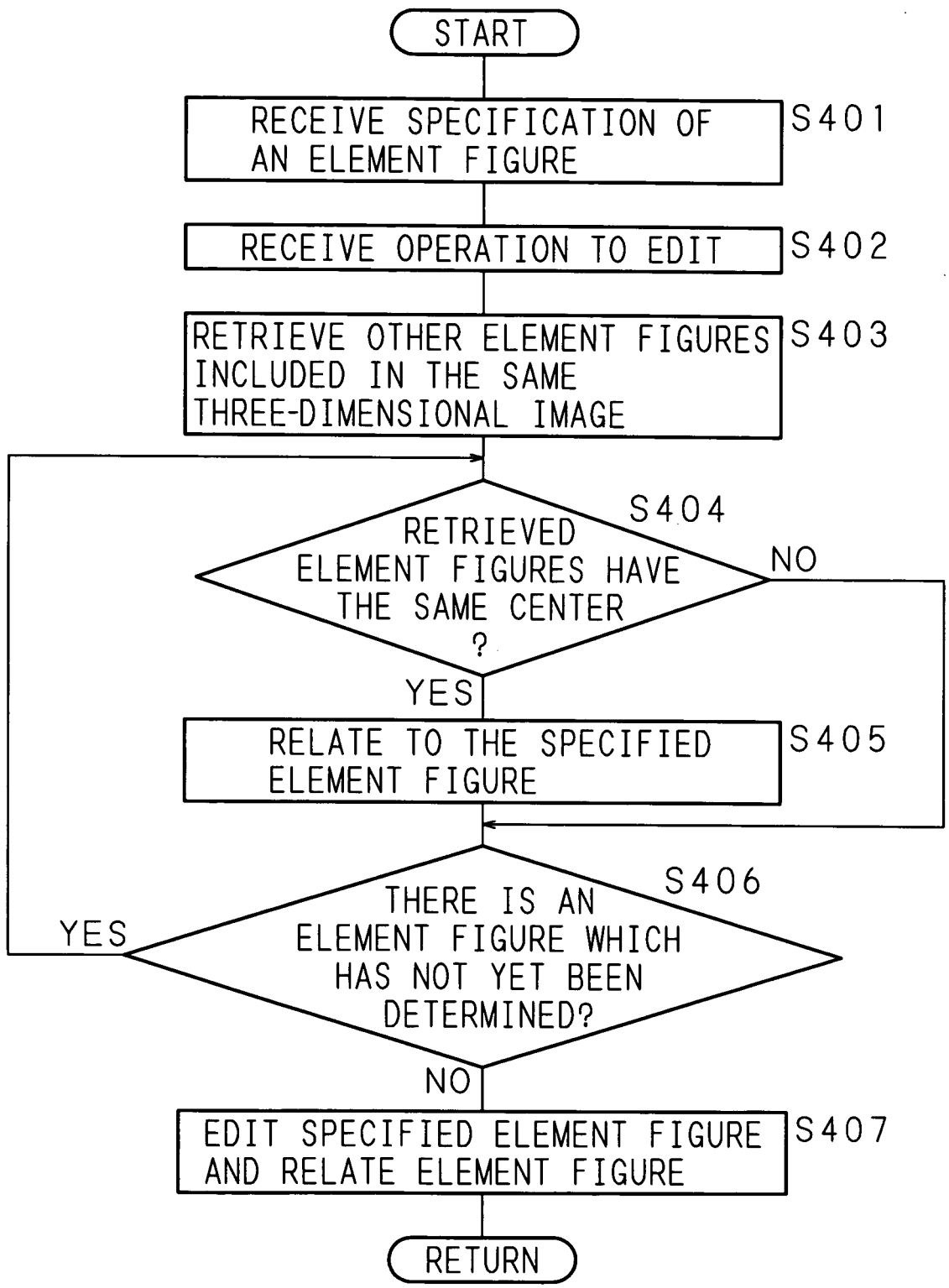
FIG. 14 is a flowchart showing the concentric relating process performed by the image editing apparatus of the present invention.

FIG. 14 is a flowchart showing the concentric relating process performed by the image editing apparatus 10 of the present invention.

The operator specifies an element figure included in a three-dimensional image by the input means 15, and inputs an operation to edit the specified element figure by a method such as move, for example, an operation specifying a direction and distance of moving the element figure.

In the image editing apparatus 10, under the control of the CPU 11 executing the computer program PG stored in the RAM 14, specification of an element figure is received (S401), and an operation to edit the specified element figure is received (S402).

Regarding a determination as to whether or not it is necessary to perform relating, suppose that a determination that relating was necessary was made automatically based on the type of the received operation, or manually based on the input of the operator.

Under the control of the CPU 11 executing the computer program PG stored in the RAM 14, the image editing apparatus 10 retrieves other element figures included in the same three-dimensional image in which the specified element figure is included (S403), determines whether or not the retrieved element figures have the same center as the specified element figure (S404), and relates the element figure determined as having the same center to the specified element figure (S405).

Then, under the control of the CPU 11 executing the computer program stored in the RAM 14, the image editing apparatus 10 determines whether or not there is an element figure which has not yet been subjected to a determination as to whether or not it is necessary to perform relating shown in steps S404 and S405 in the element figures retrieved in step S403 (S406). If the image editing apparatus 10 determines that a determination as to whether or not it is necessary to perform relating was made for all the retrieved element figures (S406: NO), then it edits the element figure specified in step S401 and the element figures related in step S405, based on the operation received in step S402 (S407).

In step S406, if the image reading apparatus 10 determines that there is an element figure which has not yet been subjected to a determination as to whether or not it is necessary to perform relating (S406: YES), then it moves to step S404 and repeats the subsequent processes for the element figure which has not yet been subjected to a determination as to whether or not it is necessary to perform relating.

Note that if the element figure specified in step S401 has a spherical shape, then the center in step S404 is the center of the sphere, which is the specified element figure. If the element figure specified in step S401 has a columnar, cylindrical or conical shape with a center axis, then the center in step S404 is the center axis of the specified element figure.

Figure 15:
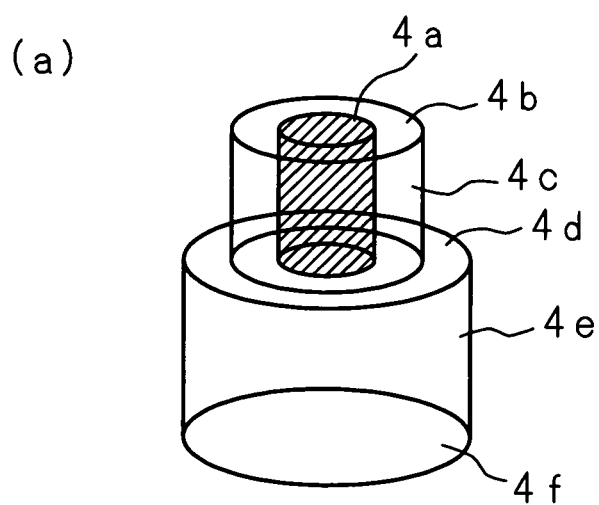
FIG. 15 is a perspective view of a three-dimensional image to be processed by the image editing apparatus of the present invention.
Figure 15:
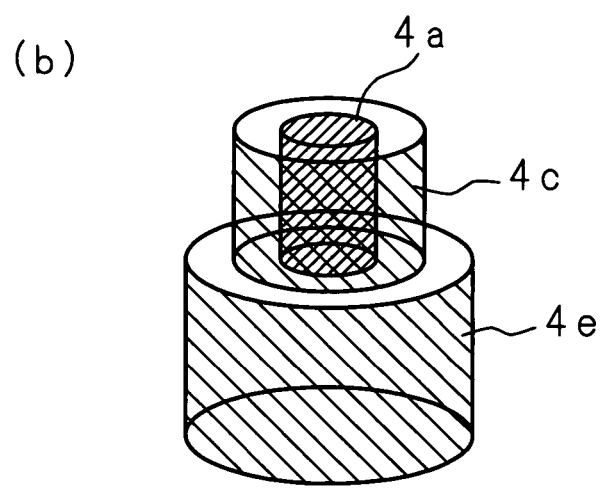

FIG. 15 is a perspective view of a three-dimensional image to be processed by the image editing apparatus 10 of the present invention.

FIG. 15 shows a three-dimensional image to be processed, and the three-dimensional image shown in FIG. 15 has a shape composed of a columnar part in the shape of a circular column and a cylindrical part in the shape of a cylinder having the same center as the columnar part and placed on the columnar part.

First, suppose that an element FIG. 4a that is a cylindrical inner curved surface of the cylindrical part of the three-dimensional image was specified in step 401 of the concentric relating process explained using FIG. 14.

FIG. 15(a) shows a state in which the element FIG. 4a as the cylindrical inner curved surface of the three-dimensional image was specified in step S401.

FIG. 15(b) shows a state in which other element FIGS. 4b, 4c, 4d, 4e and 4f included in the same three-dimensional image including the element FIG. 4a specified in step S401 of the concentric relating process, that is, the three-dimensional image composed of a columnar part and a cylindrical part in the example shown in FIG. 14, were retrieved, and the element FIGS. 4c and 4e having the same center axis as the specified element FIG. 4a in the retrieved element FIGS. 4b, 4c, 4d, 4e and 4f were related to the element FIG. 4a in step S405.

Note that the element FIG. 4c is an outer cylindrical curved surface of the cylindrical part, and the element FIG. 4e is a curved surface of the columnar part.

Thus, the element FIGS. 4c and 4e having the same center axis as the specified element FIG. 4a are related to the element FIG. 4a, and the element FIGS. 4c and 4e related to the element FIG. 4a are edited together with the element FIG. 4a based on the editing operation with respect to the element FIG. 4a.

Next, the following description will explain the processes of retrieving element figures included in a projecting part or a hollow part and relating them.

Figure 16:
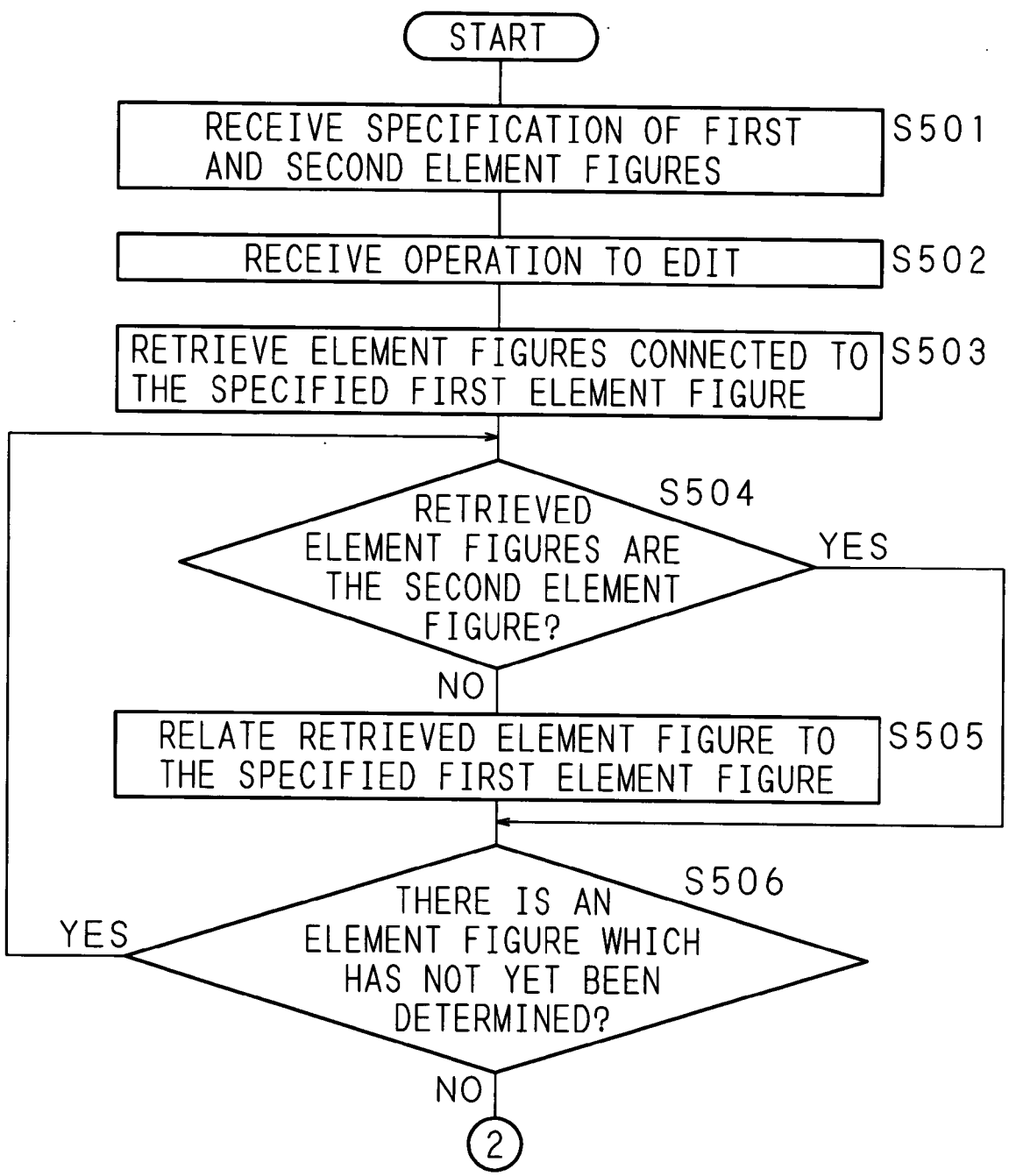
FIG. 16 is a flowchart showing the projecting part or hollow part relating process performed by the image editing apparatus of the present invention.
Figure 17:
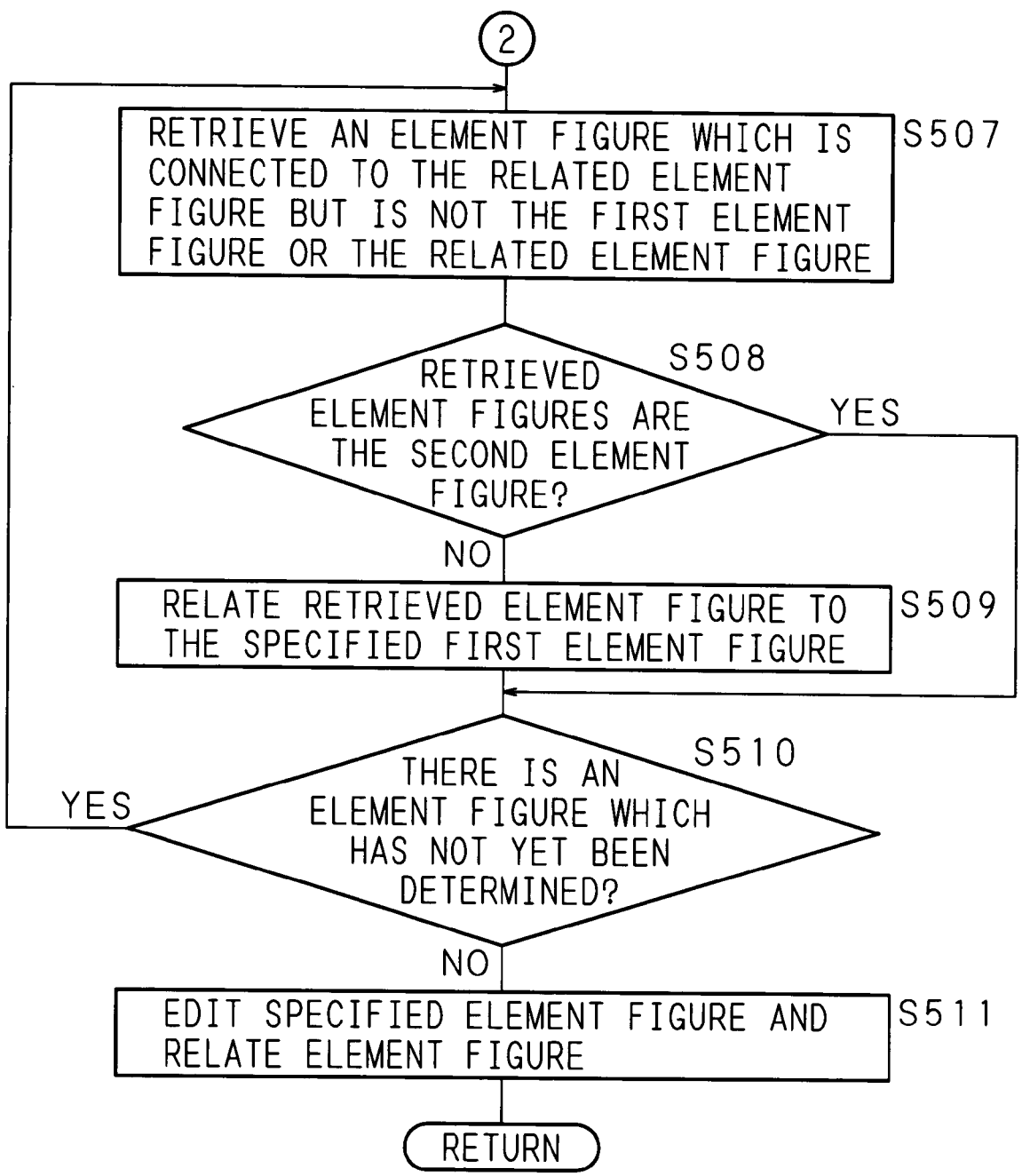
FIG. 17 is a flowchart showing the projecting part or hollow part relating process performed by the image editing apparatus of the present invention.

FIG. 16 and FIG. 17 are a flowchart showing a projecting part or hollow part relating process of the image editing apparatus 10 of the present invention.

The operator specifies a first element figure and a second element figure included in a three-dimensional image by the input means 15, and inputs an operation to edit the specified element figures by a method such as move, for example, an operation specifying a direction and distance of moving the element figures.

Here, the first element figure is an element figure included in a projecting part or a hollow part, and the second element figure is an element figure such as a plane used as a reference to determine a projecting part or a hollow part.

In the image editing apparatus 10, under the control of the CPU 11 executing the computer program PG stored in the RAM 14, specification of first and second element figures is received (S501), and an operation to edit the specified element figures is received (S502).

Regarding a determination as to whether or not it is necessary to perform relating, suppose that a determination that relating was necessary was made automatically based on the type of the received operation, or manually based on the input of the operator.

Under the control of the CPU 11 executing the computer program PG stored in the RAM 14, the image editing apparatus 10 retrieves element figures connected to the specified first element figure (S503), and determines whether or not each of the retrieved element figures is the specified second element figure (S504).

In step S504, if the retrieved element figure is determined as not being the specified second element figure (S504: NO), then under the control of the CPU 11 executing the computer program PG stored in the RAM 14, the image editing apparatus 10 relates the element figure determined as not being the second element figure to the first element figure (S505)

Under the control of the CPU 11 executing the computer program PG stored in the RAM 14, the image editing apparatus 10 determines whether or not there is an element figure which has not yet been subjected to a determination as to whether or not it is necessary to perform relating shown in steps S504 and S505 in the element figures retrieved in step S503 (S506). If the image editing apparatus 10 determines that there is an element figure which has not yet been subjected to a determination as to whether or not it is necessary to perform relating in the element figures retrieved in step S503 (S506: YES), then it moves to step S504 and repeats the subsequent processes for the element figure which has not yet been subjected to a determination as to whether or not it is necessary to perform relating.

In step S504, if the retrieved element figure is determined as being the second element figure (S504: YES), then the image editing apparatus 10 does not relate this element figure and moves to step S506.

In step S506, if the image editing apparatus 10 determines that a determination as to whether or not it is necessary to perform relating was made for all the retrieved element figures (S506: NO), then under the control of the CPU 11 executing the computer program PG stored in the RAM 14, the image editing apparatus 10 further retrieves an element figure which is connected to the element figure related to the first element figure but is not the first element figure or the element figure related to the first element figure (S507), and further determines whether or not the further retrieved element figure is the specified second element figure (S508).

In step S508, if the further retrieved element figure is determined as not being the second element figure (S508: NO), then under the control of the CPU 11 executing the computer program PG stored in the RAM 14, the image editing apparatus 10 relates the element figure determined as not being second element figure to the first element figure (S509).

Then, under the control of the CPU 11 executing the computer program PG stored in the RAM 14, the image editing apparatus 10 determines whether or not there is an element figure which has not yet been subjected to a determination as to whether or not it is necessary to perform relating shown in steps S508 and 509 in the element figures further retrieved in step S507 (S510). If the image editing apparatus 10 determines that there is an element figure which has not yet been subjected to a determination as to whether or not it is necessary to perform relating (S510: YES), then it moves to step S507 and repeats the subsequent processes for the element figure which has not yet been subjected to a determination as to whether or not it is necessary to perform relating.

The process of determining whether or not it is necessary to perform relating shown in steps S507 through S509 is performed not only for the element figures related in step S505, but also for element figures connected to the element figures related in step S509.

In step S508, if the retrieved element figure is determined as being the second element figure (S508: YES), the image editing apparatus 10 does not relate this element figure and moves to step S510.

In step S510, if the image editing apparatus 10 determines that a determination as to whether or not it is necessary to perform relating was made for all the further retrieved element figures (S510: NO), then under the control of the CPU 11 executing the computer program PG stored in the RAM 14, the image editing apparatus 10 edits the first element figure specified in step S501 and the element figures related to the first element figure in steps S505 and S509, based on the operation received in step S502 (S511).

Figure 18:
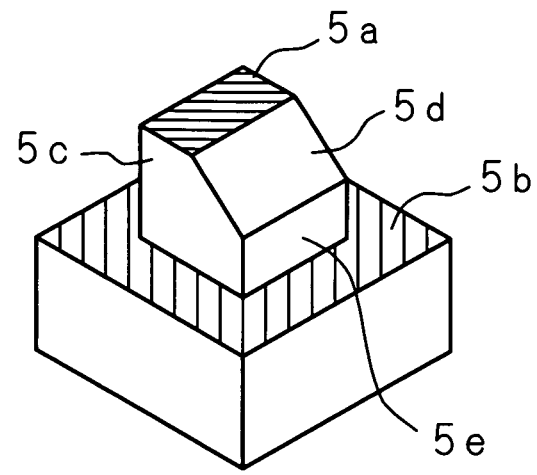
FIG. 18 is a perspective view of a three-dimensional image to be processed by the image editing apparatus of the present invention.
Figure 18:
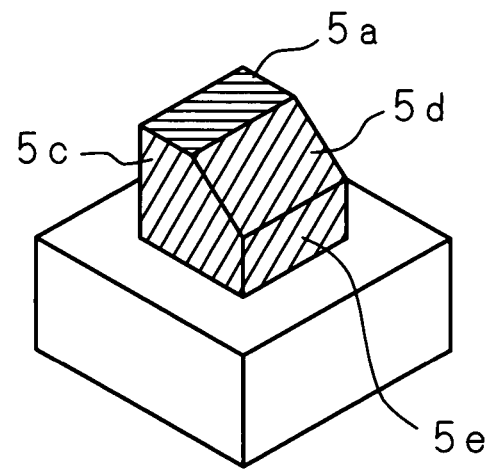

FIG. 18 is a perspective view of a three-dimensional image to be processed by the image editing apparatus 10 of the present invention.

FIG. 18 shows a three-dimensional image to be processed, and the three-dimensional image shown in FIG. 18 has a shape composed of a rectangular parallelepiped base part and a pentagonal prism placed as a projecting part on the top face of base part.

FIG. 18(a) shows a state in which the top face of the projecting part of the three-dimensional image was specified as a first element FIG. 5a, and the top face of the base part was specified as a second element FIG. 5b in step S501.

By specifying the first element FIG. 5a, element FIGS. 5c and 5d connected to the first element FIG. 5a are retrieved, and the retrieved element FIGS. 5c and 5d are related to the first element FIG. 5a because they are not the second element FIG. 5b.

Further, element FIGS. 5b and 5e are retrieved as element figures which are connected to the element FIG. 5c related to the first element FIG. 5a but are not the first element FIG. 5a or the element figure related to the first element FIG. 5a.

A determination is made as to whether or not the retrieved element FIGS. 5b and 5e are the specified second element FIG. 5b, and then the element FIG. 5e which is not the second element FIG. 5b is related to the first element FIG. 5a.

FIG. 18(b) shows a state in which the element FIGS. 5c, 5d and 5e were thus related to the first element FIG. 5a. It is clear from FIG. 18(b) that the first element FIG. 5a and the element FIGS. 5c, 5d and 5e related to the first element FIG. 5a are the projecting part.

Needless to say, the same processes are also performed for the element figures lying in a direction which is not shown in FIG. 18.

Figure 19:
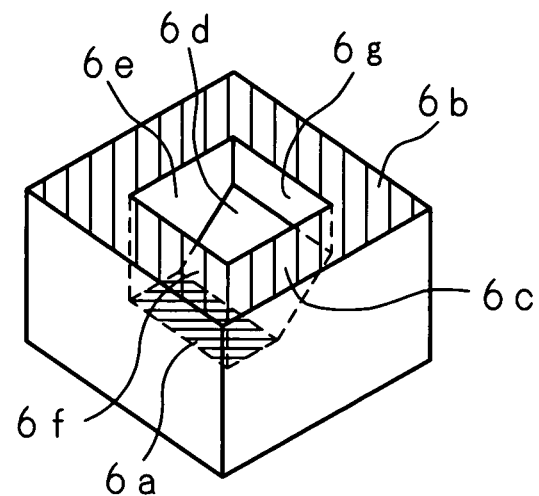
FIG. 19 is a perspective view of a three-dimensional image to be processed by the image editing apparatus of the present invention.
Figure 19:
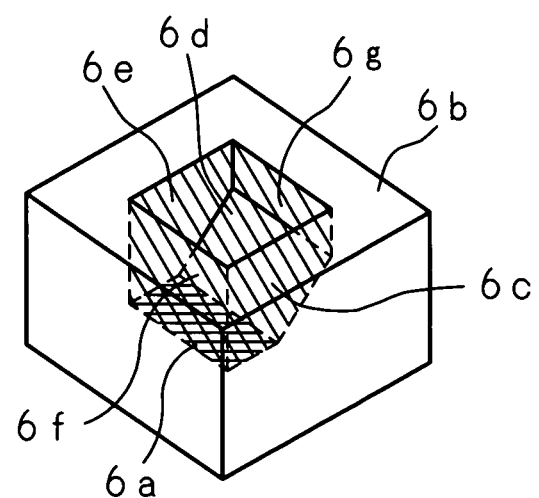

FIG. 19 is a perspective view of a three-dimensional image to be processed by the image editing apparatus 10 of the present invention.

FIG. 19 shows a three-dimensional image to be processed, and the image shown in FIG. 19 has a shape composed of a rectangular parallelepiped base part and a hollow part in the shape of a pentagonal prism formed in the base part.

FIG. 19(a) shows a state in which the bottom face of the hollow part of the three-dimensional image was specified as a first element FIG. 6a, and the top face of the base part is specified as a second element FIG. 6b in step S501.

By specifying the first element FIG. 6a, element FIGS. 6c, 6d, 6e and 6f which are connected to the first element FIG. 6a are retrieved, and the retrieved element FIGS. 6c, 6e, 6e and 6f are related to the first element FIG. 6a because they are not the second element FIG. 6b.

Further, element FIGS. 6b and 6g are retrieved as element figures which are connected to the element FIG. 6c related to the first element FIG. 6a but are not the first element FIG. 6a or the element figure related to the first element FIG. 6a.

A determination is made as to whether or not the retrieved element FIGS. 6b and 6g are the specified second element FIG. 6b, and then the element FIG. 6g which is not the second element FIG. 6b is related to the first element FIG. 6a.

FIG. 19(b) shows a state in which the element FIGS. 6c, 6d, 6e, 6f and 6g were thus related to the first element FIG. 6a. It is clear from FIG. 19(b) that the first element FIG. 6a and the element FIGS. 6c, 6d, 6e, 6f and 6g related to the first element FIG. 6a are the hollow part.

Next, the following description will explain the processes of retrieving element figures having a shell relationship to the specified element figure and relating them.

Figure 20:
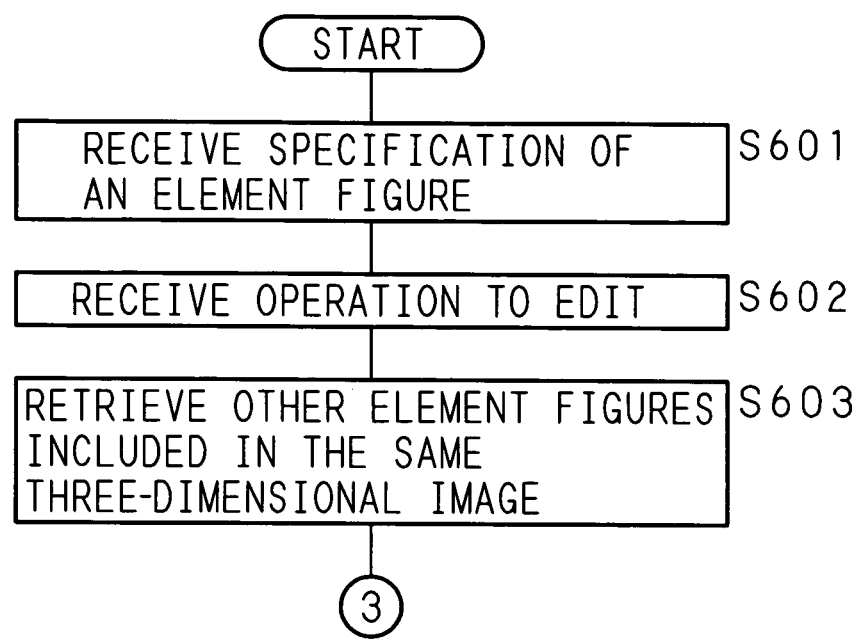
FIG. 20 is a flowchart showing the shell relating process performed by the image editing apparatus of the present invention.
Figure 21:
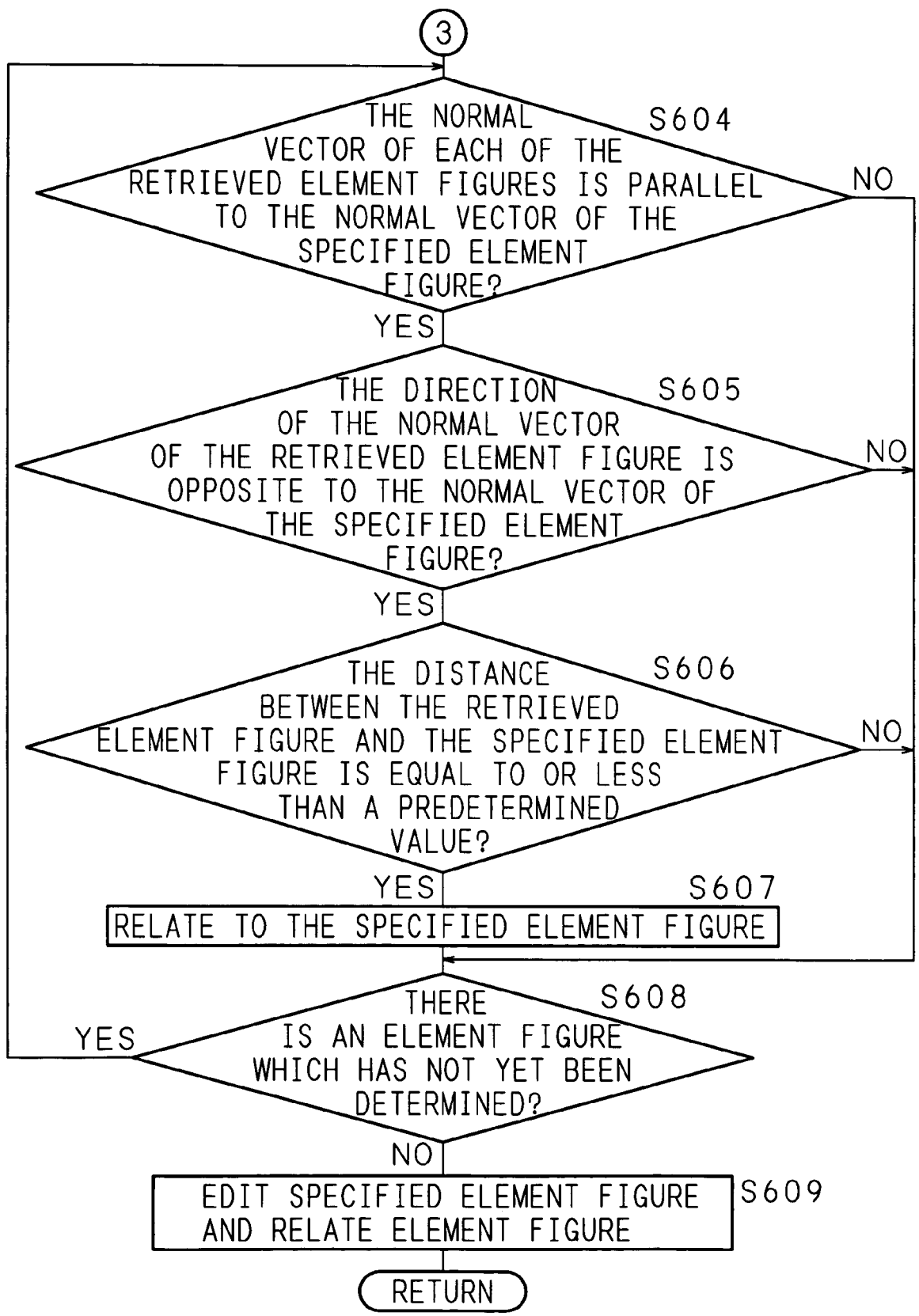
FIG. 21 is a flowchart showing the shell relating process performed by the image editing apparatus of the present invention.

FIG. 20 and FIG. 21 are a flowchart showing the shell relating process performed by the image editing apparatus 10.

The operator specifies an element figure included in a three-dimensional image by the input means 15, and inputs an operation to edit the specified element figure by a method such as move, for example, an operation specifying a direction and distance of moving the element figure.

In the image editing apparatus 10, under the control of the CPU 11 executing the computer program PG stored in the RAM 14, specification of an element figure is received (S601), and an operation to edit the specified element figure is received (S602).

Regarding a determination as to whether or not it is necessary to perform relating, suppose that a determination that relating was necessary was made automatically based on the type of the received operation, or manually based on the input of the operator.

Moreover, for element figures such as a plane, a normal vector perpendicular to the surface and pointing outward with respect to the three-dimensional image in which the element figure is included was set in advance.

Under the control of the CPU 11 executing the computer program PG stored in the RAM 14, the image editing apparatus 10 retrieves other element figures included in the same three-dimensional image in which the specified element figure is included (S603), and determines whether or not the normal vector of each of the retrieved element figures is parallel to the normal vector of the specified element figure (S604).

In step S604, if the image editing apparatus 10 determines that the normal vector of the retrieved element figure is parallel to the normal vector of the specified element figure (S604: YES), then under the control of the CPU 11 executing the computer program PG stored in the RAM 14, the image editing apparatus 10 determines whether the direction of the normal vector of the retrieved element figure is opposite to the normal vector of the specified element figure (S605).

In step S605, if the image editing apparatus 10 determines that the direction of the normal vector of the retrieved element figure is opposite to the normal vector of the specified element figure (S605: YES), then under the control of the CPU 11 executing the computer program PG stored in the RAM 14, the image editing apparatus 10 determines whether the distance between the retrieved element figure and the specified element figure is equal to or less than a predetermined value (S606).

In step S606, if the image editing apparatus 10 determines that the distance between the retrieved element figure and the specified element figure is equal to or less than the predetermined value (S606: YES), then under the control of the CPU 11 executing the computer program PG stored in the RAM 14, the image editing apparatus 10 relates the retrieved element figure to the specified element figure (S607).

Under the control of the CPU 11 executing the computer program PG stored in the RAM 14, the image editing apparatus 10 determines whether or not there is an element figure which has not yet been subjected to a determination as to whether or not it is necessary to perform relating shown in steps S604 through S607 in the element figures retrieved in step S603 (S608). If the image editing apparatus 10 determines that a determination as to whether or not it is necessary to perform relating was made for all the retrieved element figures (S608: NO), then it edits the element figure specified in step S601 and the element figures related in step S607, based on the operation received in step S602 (S609).

In step S608, if the image reading apparatus 10 determines that there is an element figure which has not yet been subjected to a determination as to whether or not it is necessary to perform relating shown in steps S604 through S607 (S608: YES), then it moves to step S604 and repeats the subsequent processes for the element figure which has not yet been subjected to a determination as to whether or not it is necessary to perform relating.

Moreover, if the image editing apparatus determines in step S604 that the normal vector of the retrieved element figure is not parallel to the normal vector of the specified element figure (S604: NO), or determines in step S605 that the direction of the normal vector of the retrieved element figure is the same as the normal vector of the specified element figure (S605: NO), or determines in step S606 that the distance between the retrieved element figure and the specified element figure is greater than the predetermined value (S606: NO), then it does not perform the relating process of step S607, and moves to step 608 and performs the subsequent processes.

Thus, the element figure determined as having the normal vector parallel and pointing in the opposite direction to that of the specified element figure and being at a distance equal to or less than the predetermined value from the specified element figure is determined as having a shell relationship to the specified element figure and related to the specified element figure.

Figure 22:
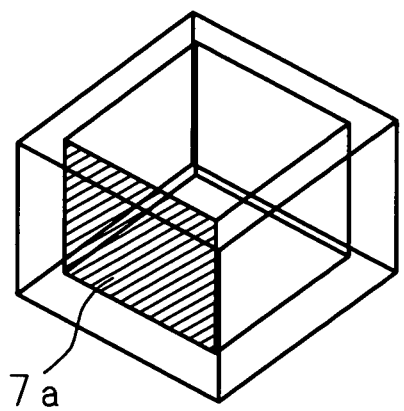
FIG. 22 is a perspective view of a three-dimensional image to be processed by the image editing apparatus of the present invention.
Figure 22:
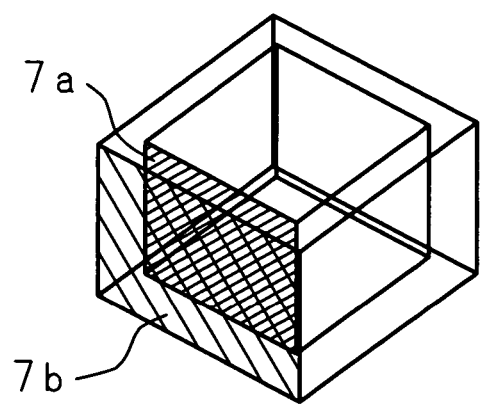

FIG. 22 is a perspective view of a three-dimensional image to be processed by the image editing apparatus 10 of the present invention.

FIG. 22 shows a three-dimensional image to be processed, and the three-dimensional image shown in FIG. 22 is a hollow rectangular parallelepiped with all surfaces thinned as a shell.

FIG. 22(*a*) shows a state in which an element FIG. 7*a* which is one of the inner faces of the three-dimensional image was specified in step S601 of the shell relating process explained using FIG. 21 and FIG. 22.

By specifying the element FIG. 7*a*, other eleven element figures included in the same three-dimensional image in which the element FIG. 7*a* is included are retrieved, and an element FIG. 7*b*, which has the normal vector parallel and pointing in a direction opposite to that of the element FIG. 7*a* and is located at a distance equal to or less than the predetermined value from the element FIG. 7*a*, in the retrieved element figures is related to the element FIG. 7*a*.

FIG. 22(*b*) shows a state in which the element FIG. 7*b* was related to the specified element FIG. 7*a*.

Various types of processes for retrieving element figures having a specific relationship to a specified element figure and relating the retrieved element figures to the specified element figures have been explained, and it may also be possible to perform various types of relating processes in combination instead of performing them separately.

Next, the following description will explain an example of relating an element figure having a specific relationship with a specified element figure after performing plural types of retrieval.

Figure 23:
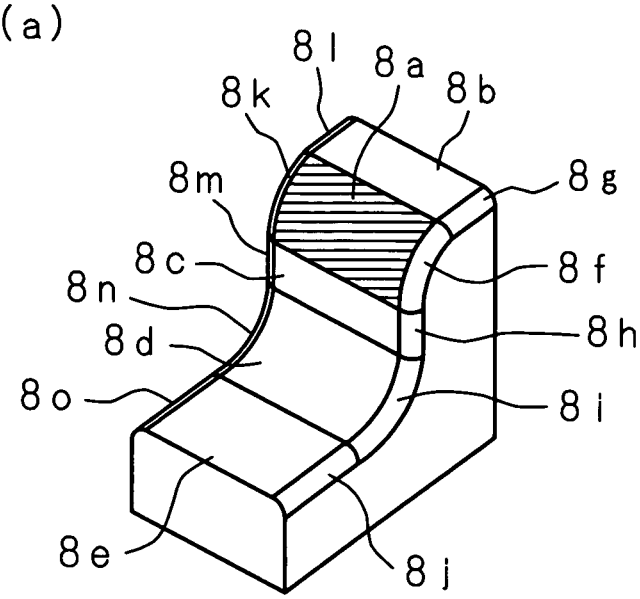
FIG. 23 is a perspective view of a three-dimensional image to be processed by the image editing apparatus of the present invention.
Figure 23:
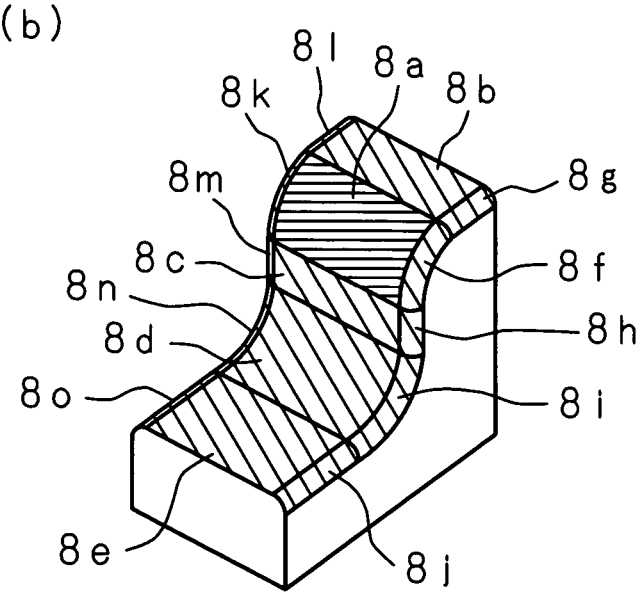

FIG. 23 is a perspective view of a three-dimensional image to be processed by the image editing apparatus 10 of the present invention.

FIG. 23 shows a three-dimensional image to be processed, and the three-dimensional image shown in FIG. 23 is a prism in which a surface shown on the right front side in the drawing and a surface opposing this surface are L-shaped bottom faces, part of the side faces of the prism is formed by a plane or five element FIGS. 8*a*, 8*b*, 8*c*, 8*d* and 8*e* connected in a tangent continuous manner, and the ridgelines between the respective element FIGS. 8*a*, 8*b*, 8*c*, 8*d* and 8*e* and the bottom face are included in the curved surfaces formed as fillets.

The following description will explain the case in which an element FIG. 8*a* as one of the element figures connected in a tangent continuous manner in FIG. 23 was specified, element figures having a fillet relationship to the specified element FIG. 8*a* and element figures connected to the specified element FIG. 8*a* in a tangent continuous manner were retrieved and related to the element FIG. 8*a*.

FIG. 23(*a*) shows a state in which the element FIG. 8*a* as one of the element figures included in the three-dimensional image was specified.

By specifying the element FIG. 8*a*, the element FIGS. 8*b*, 8*c*, 8*d* and 8*e* connected directly or indirectly to the element FIG. 8*a* in a tangent continuous manner are related to the element FIG. 8*a*.

Moreover, the element FIGS. 8*f*, 8*g*, 8*h*, 8*i* and 8*j* and element FIGS. 8*k*, 8*l*, 8*m*, 8*n* and 8*o* which are curved surfaces including ridgelines of the respective element FIGS. 8*a*, 8*b*, 8*c*, 8*d* and 8*e* are retrieved and related to the element FIG. 8*a*.

FIG. 23(*b*) shows a state in which the element FIGS. 8*b*, 8*c*, 8*d*, 8*e*, 8*f*, 8*g*, 8*h*, 8*i*, 8*j*, 8*k*, 8*l*, 8*m*, 8*n* and 8*o* were related to the specified element FIG. 8*a*.

Figure 24:
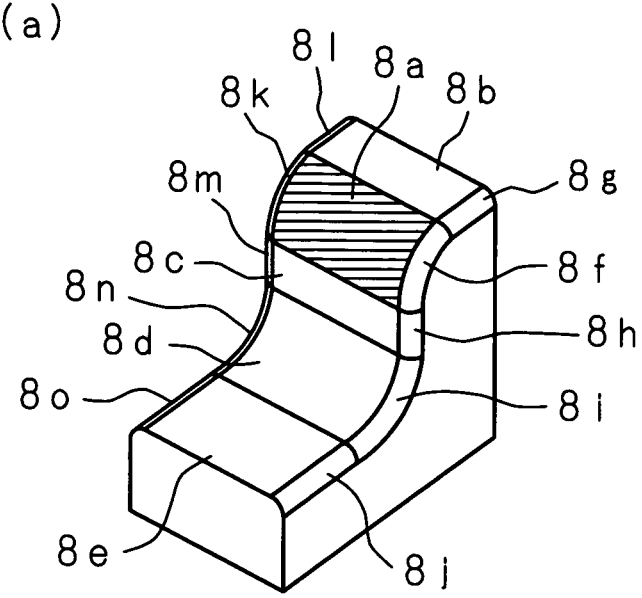
FIG. 24 is a perspective view of a three-dimensional image to be processed by the image editing apparatus of the present invention.
Figure 24:
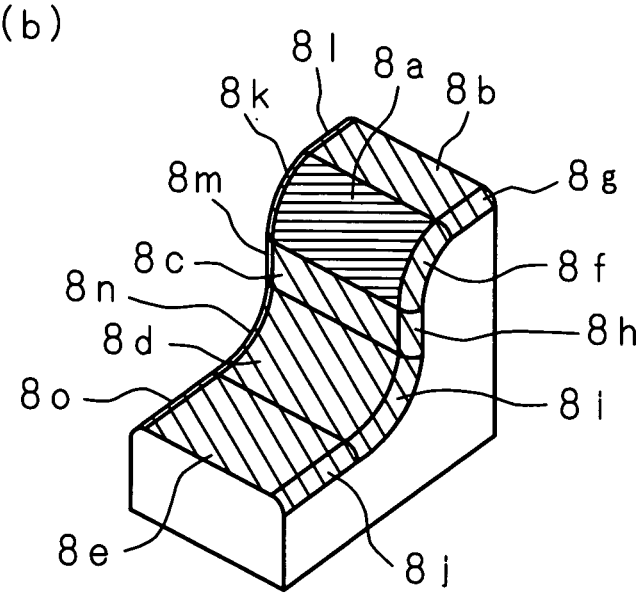

FIG. 24 is a perspective view of a three-dimensional image to be processed by the image editing apparatus 10 of the present invention.

FIG. 24 shows a three-dimensional image to be processed, and the three-dimensional image shown in FIG. 24 is cylindrical in shape in which the ridgelines between the top surface in the drawing and the outer side face and inner side face are included in the curved surfaces formed as fillets.

The following description will explain the case in which an element FIG. 9*a* as the inner side face in FIG. 24 was specified, an element figure having a concentric relationship to the specified element FIG. 9*a* and an element figure having a fillet relationship to the specified element FIG. 9*a* were retrieved and related to the element FIG. 9*a*.

FIG. 24(*a*) shows a state in which the element FIG. 9*a* as one of the element figures included in the three-dimensional image was specified.

FIG. 24(*b*) shows a state in which other element figures were related to the specified element FIG. 9*a*. By specifying the element FIG. 9, element FIGS. 9*b*, 9*c*, 9*d*, 9*e* and 9*f* included in the same three-dimensional image in which the element FIG. 9*a* is included are retrieved, and the element FIG. 9*c*, which has a concentric relationship to the element FIG. 9*a*, in the retrieved element FIGS. 9*b*, 9*c*, 9*d*, 9*e* and 9*f* is related to the specified element FIG. 9*a*.

Moreover, the element FIGS. 9*d* and 9*e* connected to the specified element FIG. 9*a* are retrieved, and the element FIG. 9*e*, which is a fillet formed as a curved surface including the ridgeline of the specified element FIG. 9*a*, in the retrieved element FIGS. 9*d* and 9*e* is related to the element FIG. 9*a*.

Note that the element FIG. 9*f*, which is a fillet formed as a curved surface including the ridgeline of the element FIG. 9*c* related to the element FIG. 9*a* because it has a concentric relationship to the element FIG. 9*a*, is also related to the element FIG. 9*a*.

Figure 25:
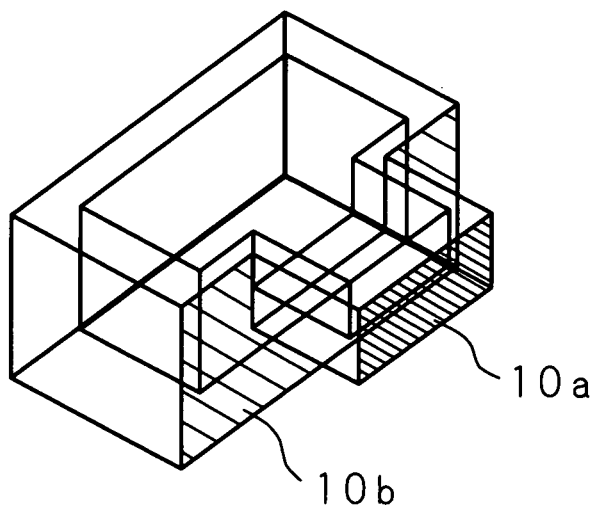
FIG. 25 is a perspective view of a three-dimensional image to be processed by the image editing apparatus of the present invention.
Figure 25:
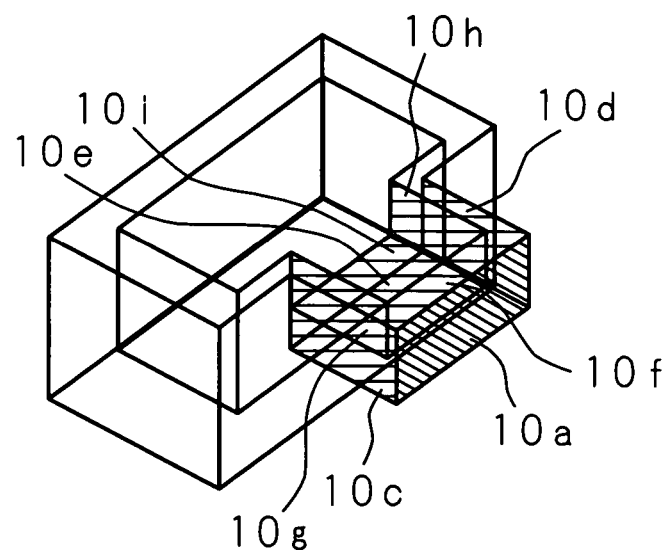

FIG. 25 is a perspective view of a three-dimensional image to be processed by the image editing apparatus 10 of the present invention.

FIG. 25 shows a three-dimensional image to be processed, and the three-dimensional image shown in FIG. 25 has an outer shape composed of two, large and small, rectangular parallelepipeds, wherein the small rectangular parallelepiped is formed as a projecting part on one face of the large rectangular parallelepiped, and the inside was made thinner (shell) with respect to the outer shape.

The following description will explain the case in which an element FIG. 10*a* as a surface in the outer shape of the small rectangular parallelepiped, which is not connected to the large rectangular parallelepiped in FIG. 25, was specified as a first element figure representing a projecting part, an element FIG. 10*b* as a surface in the large rectangular parallelepiped, which is connected to the small rectangular parallelepiped, was specified as a second element figure functioning as a reference surface, and element figures constituting the projecting part including the specified first element FIG. 10*a* and element figures having a shell relationship to the projecting part were retrieved and related to the element FIG. 10*a*.

FIG. 25(*a*) shows a state in which the element FIG. 10*a* as one of the element figures included in the three-dimensional image was specified as the first element figure, and the element FIG. 10b was specified as the second element figure.

FIG. 25(b) shows a state in which other element figures were related to the specified element FIG. 10a. By specifying the element FIG. 10a as the first element figure and specifying the element FIG. 10b as the second element figure, element FIGS. 10c, 10d and 10e which are all in the same projecting part including the element FIG. 10a and connected to the left side, right side and lower side, respectively, of the element FIG. 10a in the drawing are related to the element FIG. 10a.

Further, element FIGS. 10f, 10g, 10h, and 10i having a shell relationship to the element FIGS. 10a, 10c, 10d and 10d, respectively, are related to the element FIG. 10a.

The above-described embodiment illustrates a mode in which element figures having a G1 continuity or fillet relationship, a concentric or fillet relationship, and a projection or shell relationship to a specified element figure are related, but it may also be possible to relate element figures having other types of relationships to the specified element figure, or retrieve element figures having three or more types relationships to the specified element figure and relate them to the specified element figure.

As described in detail above, according to the image editing method, image editing apparatus, computer program and memory product of the present invention, when editing a three-dimensional image including a plurality of element figures such as a quadrangular plane, a curved surface including a ridgeline, and a cylinder by using the image editing apparatus such as a three-dimensional CAD apparatus, upon specification of one element figure in the three-dimensional image, other element figures connected to the specified one element figure or other element figures included in the same three-dimensional image in which the one element figure is included are retrieved, and other element figure in the retrieved other element figures, which was determined as having a specific relationship to the one element figure is related to the one element figure. Thus, since a plurality of element figures to be edited in the same manner as the one element figure can be specified by a simple operation in editing the image, the present invention has advantageous effects, such as enabling an improvement in operability and preventing erroneous operation when specifying element figures.

Moreover, by editing a specified element figure and element figures related to the specified element figure collectively based on an operation received by the image editing apparatus, the present invention has advantageous effects, such as enabling an improvement in operability and preventing erroneous operation when specifying element figures.

Further, by automatically determining whether or not it is necessary to perform relating processes with respect to a specified element figure based on the types of operations such as move, offset, change of the radius, and delete, the operator can execute a simplified process for specifying element figures without performing special operations, and thus the present invention has advantageous effects, such as enabling an improvement in operability and preventing erroneous operation when specifying element figures.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image editing apparatus for editing a three-dimensional image including a plurality of element figures, comprising:
   one or more computers configured to execute an operation including:
      receiving specification of first and second element figures;
      retrieving element figures connected to the specified first element figure;
      determining whether each of the retrieved element figures is the specified second element figure;
      relating the element figure determined as not being the second element figure to the first element figure; and
      retrieving element figures which are connected to the element figure related to the first element figure and are not the first element figure or the element figure related to the first element figure.

2. The image editing apparatus as set forth in claim 1, the operation comprising:
   receiving an operation to edit the specified element figure; and
   editing the specified element figure and the element figures related to the specified element figure, based on the received operation.

3. The image editing apparatus as set forth in claim 2, the operation comprising:
   discriminating a type of editing based on the received operation; and
   determining whether or not it is necessary to perform relating with respect to the specified element figure, based on the discriminated type.

4. A non-transitory computer readable medium for controlling a computer and storing a program which causes the computer to execute a process for editing a three-dimensional image including a plurality of element figures, comprising:
   receiving specification of first and second element figures;
   retrieving third element figures connected to the specified first element figure;
   determining whether each of the retrieved third element figures is the specified second element figure;
   relating the third element figure determined as not being the second element figure to the first element figure; and
   retrieving fourth element figures which are connected to the third element figures related to the first element figure, the fourth element figures being neither the first element figure nor the third element figures related to the first element figure.

* * * * *